US011441979B2

(12) United States Patent
Milne et al.

(10) Patent No.: US 11,441,979 B2
(45) Date of Patent: Sep. 13, 2022

(54) THAWING METHODS AND APPARATUS

(71) Applicant: ASYMPTOTE LTD., Cambridge (GB)

(72) Inventors: Stuart Milne, Cambridge (GB);
Stephen Lamb, Cambridge (GB);
Christopher Creasey, Cambridge (GB);
Alex Nancekievill, Cambridge (GB);
Rupert Rutledge, Cambridge (GB)

(73) Assignee: ASYMPTOTE LTD., Cambridge (GB)

( * ) Notice: Subject to any disclaimer, the term of this patent is extended or adjusted under 35 U.S.C. 154(b) by 647 days.

(21) Appl. No.: 15/532,815

(22) PCT Filed: Dec. 4, 2015

(86) PCT No.: PCT/GB2015/053720
§ 371 (c)(1),
(2) Date: Jun. 2, 2017

(87) PCT Pub. No.: WO2016/087873
PCT Pub. Date: Jun. 9, 2016

(65) Prior Publication Data
US 2019/0003939 A1 Jan. 3, 2019

(30) Foreign Application Priority Data
Dec. 4, 2014 (GB) .................................... 1421556

(51) Int. Cl.
A01N 1/02 (2006.01)
G01N 1/44 (2006.01)
(Continued)

(52) U.S. Cl.
CPC ............. *G01N 1/44* (2013.01); *A01N 1/0242* (2013.01); *A01N 1/0284* (2013.01);
(Continued)

(58) Field of Classification Search
CPC ...... A01N 1/02; A01N 1/0268; A01N 1/0284; A01N 1/0242; A01N 1/0257; G01N 25/18;
(Continued)

(56) References Cited

U.S. PATENT DOCUMENTS 5,497,562 A * 3/1996 Pikus ................... C08G 63/785
34/266
5,598,888 A 2/1997 Sullivan et al.
(Continued)

FOREIGN PATENT DOCUMENTS

EP 2705752 12/2014
WO 0072902 12/2000
(Continued)

OTHER PUBLICATIONS

International Search Report and Written Opinion; International Application No. PCT/GB2015/053720; International Filing Date Dec. 4, 2015; dated Jun. 14, 2016, 17 pages.
(Continued)

Primary Examiner — Helena Kosanovic
Assistant Examiner — Ayub A Maye
(74) Attorney, Agent, or Firm — Eversheds Sutherland (US) LLP

(57) ABSTRACT

The invention provides a method of thawing a sample comprised in a container, the method comprising the steps of: a) calculating an agitation program as a function of either or both of the sample volume and the type of the container, and the ice fraction in the sample, and optionally the thermal conductivity of the sample container; b) agitating said sample according to the program to agitate at least one region of the sample; and c) changing the agitation program applied to at least one region of the sample in response to changes in the sample volume and/or sample ice fraction.

(Continued)

The invention further provides a method of reducing shearing to cells during a method of agitation, and methods for thawing a sample wherein a sample container is differentially heated. An apparatus for use in the methods is also provided, as is an apparatus for thawing and/or cooling a sample which comprises a resilient vessel wall.

11 Claims, 7 Drawing Sheets

(51) Int. Cl.
    *B01L 3/00*     (2006.01)
    *B01L 7/00*     (2006.01)
    *B01L 7/02*     (2006.01)

(52) U.S. Cl.
    CPC .............. *B01L 3/5082* (2013.01); *B01L 7/54* (2013.01); *B01L 7/02* (2013.01); *B01L 2300/1827* (2013.01)

(58) Field of Classification Search
    CPC ........... G01N 25/4866; G01N 35/0477; G01N 2035/0446
    USPC .................. 219/438, 439, 441, 442
    See application file for complete search history.

(56) References Cited

U.S. PATENT DOCUMENTS

| | | |
|---|---|---|
| 8,388,912 B2 | 3/2013 | Schryver |
| 8,460,621 B2 | 6/2013 | Schryver et al. |
| 2006/0032607 A1* | 2/2006 | Wisniewski ............ B01F 31/24 165/47 |
| 2009/0148934 A1* | 6/2009 | Woods ..................... A01N 1/02 435/307.1 |
| 2009/0202978 A1 | 8/2009 | Shaham |
| 2010/0281886 A1* | 11/2010 | Shaham .................. A01N 1/02 62/51.1 |
| 2012/0040450 A1* | 2/2012 | Clarke ................. A01N 1/0242 435/307.1 |
| 2013/0115691 A1 | 5/2013 | Schryver |
| 2014/0165645 A1 | 6/2014 | Schryver |
| 2014/0220551 A1 | 8/2014 | Izadyar et al. |
| 2014/0255909 A1 | 9/2014 | Walter |
| 2015/0026593 A1 | 1/2015 | Cho et al. |
| 2015/0027434 A1* | 1/2015 | Murphy ................. B65D 25/04 126/263.02 |
| 2015/0125138 A1* | 5/2015 | Karnieli ............... A01N 1/0242 392/441 |
| 2015/0192357 A1* | 7/2015 | Thompson, Jr. ..... A01N 1/0252 62/62 |

FOREIGN PATENT DOCUMENTS

| | | |
|---|---|---|
| WO | 2008032314 | 3/2008 |
| WO | 2014068508 | 5/2014 |

OTHER PUBLICATIONS

Purschke et al.; "Thermal Injury Causes DNA Damage and Lethality in Unheated Surrounding Cells: Active Thermal Bystander Effect"; Journal of Investigative Dermatology; 130(1); pp. 86-92; (2010).

* cited by examiner

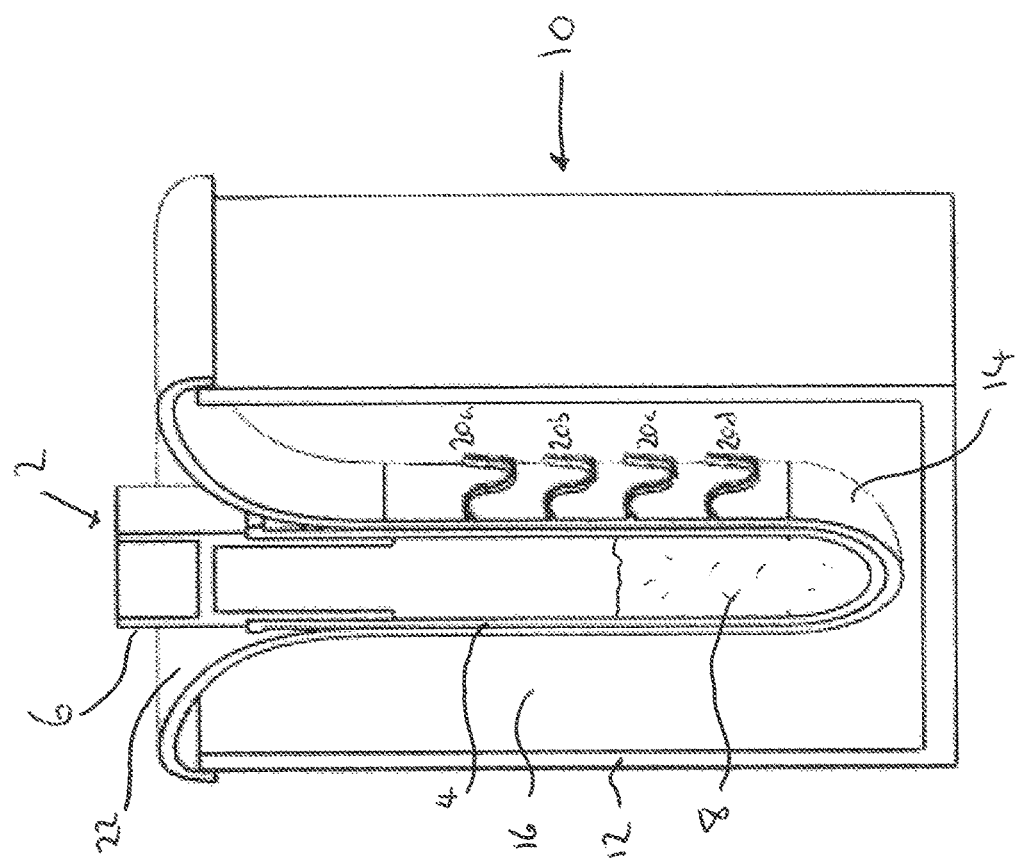
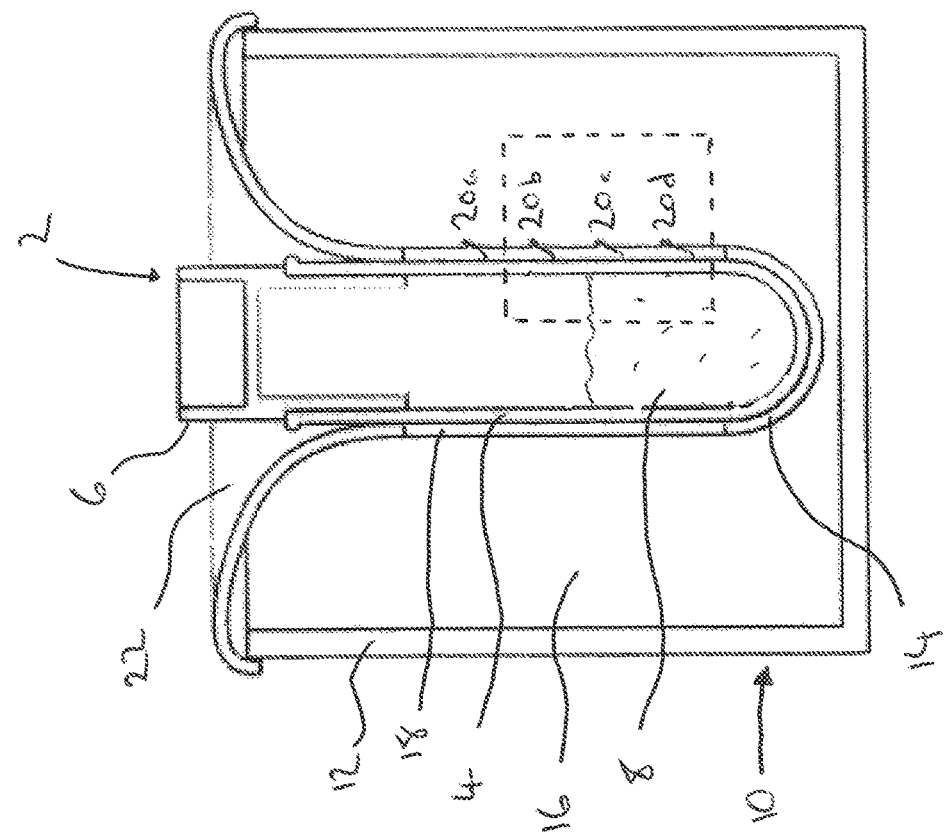
Fig. 2B
Fig. 2A

THAWING METHODS AND APPARATUS

CROSS REFERENCE TO RELATED APPLICATIONS

This application is a National Stage application of PCT/GB2015/053720, filed Dec. 4, 2015 which claims the benefit of GB Application 1421556.0, filed on Dec. 4, 2014, both of which are incorporated by reference in their entirety herein.

TECHNICAL FIELD OF INVENTION

This invention relates to methods of thawing samples, in particular samples comprising biological material. The invention is further related to apparatus for thawing samples, especially samples comprising biological material.

BACKGROUND TO THE INVENTION

Cryopreservation is a widely employed technology used to maintain long term viability of biological samples for subsequent application in medicine, biotechnology and veterinary sciences. In order to obtain high viability upon thawing, it is necessary to add protective compounds (cryoprotectants) prior to freezing samples at a controlled cooling rate. Cryoprotectants dissolve in water in the sample and serve to prevent ice crystal formation which can damage biological cellular material both through crystal formation and when the crystals thaw. Samples for cryopreservation are generally placed in specialist cryocontainers such as, for example:
  a) Straws, which are thin walled tubes of 2 to 4 mm diameter and length up to 140 mm with a capacity of 0.2 ml to 0.5 ml,
  b) Screw capped cryovials, which are wider diameter (approx. 12 mm diameter) short tubes with a capacity of 0.5 ml to 5.0 ml,
  c) Hermetically sealed cryovials with a capacity range from 0.2 ml to 50 ml (such as Aseptic Technologies Crystal vials, Cook Cell Seal vials or those supplied by West Pharma Daikyo),
  d) Flexible bags with capacity from 5 ml to 1000 ml designed for cryopreservation of larger volumes,
  e) Multiwell plates, matrix tubes and other SBS formats employed in robotics and high throughput screening.

Fill volumes in all cryocontainers can vary from almost empty to full, depending on the amount of sample to be frozen. Further, vial containers are generally filled and frozen whilst standing vertically, meaning the height at which the frozen material/air interface resides within the vial is variable from treatment to treatment.

Following freezing, samples are generally stored at a low temperature, usually that of liquid nitrogen (−196° C.), although samples can be stored at warmer temperatures in some applications. When required, the samples are thawed and it is generally considered in the art that the thawing process should be as rapid as possible to ensure cell viability, without overheating the cells, which reduces their viability. Thawing is generally achieved in current methods by placing the sample in a water bath maintained at 37° C. and removing it when substantially all ice or aqueous components have melted. Most approaches to the thawing of samples ultimately adopt the use of thermal conduction to transfer energy through the wall of the sample container, though some attempts to deliver energy to the sample using IR radiation and magnetic/electronic fields have been made.

As discussed above, it is generally believed that, a slow rate of thawing is detrimental to the recovery of cells. In terms of the mechanisms of cell damage, the optimum theoretical approach to thawing is to achieve instantaneous and uniform temperature increase from cryogenic storage temperature to the final product temperature (often 4° C.). However, in practice this is not physically possible.

The primary underlying physical constraints in achieving rapid warming in the biological sample are associated with the thermal masses of the system, the enthalpy of fusion of the frozen material, and the thermal conductivities of the wall of the container and the liquid and solid phases of the sample. In most systems energy is transferred to the biological sample by heating the wall of the container. To minimise the heating time, the rate at which heat is applied (or power) should be maximised. For idealised 1-D steady-state thermal conduction across a wall the following formula can be used;

$$P = -kA\frac{dT}{dx}$$

where P is power transmitted through a cross-sectional area A undergoing heating, k is thermal conductivity of the wall, and dT/dx the temperature gradient across the wall.

In the case of a cryovial, this equation states that to maximise the power transfer into the cryocontainers by conduction, only one variable (temperature gradient) is directly controllable. The thermal conductivity of the cryocontainer wall, its cross-sectional area and its thickness (dx) are all fixed by the manufacturer of the cryocontainer. To increase the power applied to the cryopreserved material, it is therefore necessary to increase the temperature gradient (dT) across the container wall by either increasing the external surface temperature of the container, decreasing the internal surface temperature or some combination of these.

When the wall of a container is maintained by some means at a fixed temperature, the resultant thawing curve generally contains three distinct stages during warming. This is shown for the case of a 10% wt glycerol solution system with a wall temperature of 20° C., in FIG. 6. The three distinct stages of warming are as follows:

I. Solid thermal conduction: When the sample is maintained under its glass transition temperature (approximately −45° C. for a 10% Glycerol solution), no free liquid exists in the system. Energy transfer occurs through the container wall into a solid body of ice. In this arrangement the ice is initially extremely cold and so the dT term is large. High thermal power will flow into the system and the sample will warm quickly. The rate of warming (power applied to the system) decays exponentially throughout the regime as the sample warms and the temperature gradient to the container wall is decreased II. Phase change: In this region energy must be applied to not only heat the thermal mass of the material, but to also drive a phase change from ice to liquid. The phase change will occur over a distinct temperature range when solutes are present, whereby ice fraction is a function of temperature. The temperature at which the system transitions from stage I to II is dependent on the make-up of the cryoprotectant solution. At the beginning of the phase change stage the container holds 100% solid ice, at the end of this stage the container holds 100% free liquid, with a varying ice-fraction occurring between these two extremes. Incident power into the system decays as the system warms and dT is further reduced III. Liquid Warming: Above the melting point of the material, continued warming of liquid to the terminal temperature occurs. Input power decreases exponentially until the temperature of the free liquid and the container wall are equal. The applied power then decays to zero.

Steady-state 1-dimensional thermal conduction does not fully describe the energy transfers which occur within the system described above, as it is a first order model, and one mostly applicable only to the phase change stage. In stage III, free-liquid, mass transfer or convection effects can readily redistribute thermal energy within the system; this can have a marked effect on instantaneous input power to the system. If temperature gradients exist within, for example, a cryovial as represented in FIG. 8, a situation will arise where the average fluid temperature within the container is lower than the temperature of the fluid which is in direct contact with the sidewall of the container Power that can be applied to the bulk liquid is directly proportional to the temperature differential across the container wall. If the liquid is still, and a large gradient exists within the fluid (as shown in the left hand image of FIG. 8), the fluid near the wall is warm which reduces heating power of the fluid. If the fluid is well mixed, such that at all points the fluid temperature is equal to the average fluid temperature (FIG. 8, right hand image), then the temperature gradient across the container wall is higher, increasing the applied power. The product will now thaw more quickly.

FIG. 7 indicates what occurs during the phase transition stage, stage II, of FIG. 6. FIG. 7 shows the ice fraction graph for the cryoprotectant glycerol in 0.15, NaCl, (but a similar relationship exists for other cryoprotectants such as dimethylsulphoxide, propylene glycol, etc.) The light line with solid circle markers shows ice fraction vs. temperature, while the dark line with hollow circle markers shows the enthalpy vs. temperature. In the example shown in FIG. 7 approximately 80% of the ice melts in the temperature zone −12.5° C. to −2.5° C. the remaining 20% of the ice melts in the temperature zone −64° C. (the glass transition temperature of this solution) to −12.5° C. as shown by the light line with solid marker circles on the graph. The most damaging temperature zone during thawing is believed to be associated with the thawing of the final 80% of the ice, and in the example shown in FIG. 7 this occurs between −12.5° C. and −2.5° C. On the other hand, the melting of the first 20% of the ice fraction can be carried out at a relatively slow rate of heating without any detrimental effects on cell viability.

FIG. 5 is a graph showing the thawing time required to thaw an Aseptic Technologies 6 ml vial filled with 3 ml of 10% DMSO and frozen to −100° C. and a Corning vial filled to 0.5 ml with 10% DMSO and frozen to −100° C. at different wall temperatures of the vials. The graph shows the thaw time to completion (tiny grain of ice) as a function of external wall temperature as applied by a water bath. It is clear from the result shown in the graph how much more quickly it is possible to thaw a product by elevating wall conditions.

However, when biological samples are thawed, given the biological nature of the material inside the container, the external temperature of the container in known processes is generally not heated beyond 37° C., so there is no risk of damaging the cellular or biological material inside (which may be damaged if its temperature exceeds this). In many packaging designs for the aseptic containment of cellular therapies, the walls of the packaging containers are made out of relatively thick and poor thermally conducting materials such as Cyclic Olefin Copolymer (COC). The shape of the containers is also such that there is a long path length between the inner wall and the centre of the vial. The physics of thawing such a system leads to a relatively lengthy thawing period. For example, an Aseptic Technologies vial in a 37° C. water bath with an 8 ml fill takes approximately 10 minutes to thaw. This is far from optimal in terms of cellular viability using current thawing methods.

In contrast to the methods of thawing disclosed in the art, which involve thawing samples at 37° C., the present inventors have developed new methods of thawing samples, wherein the samples can be thawed more rapidly. Particularly, the inventors have identified that, it is possible to heat the external wall of a container comprising a sample to above 37° C. whilst keeping the internal wall temperatures at or below 37° C. Thus, samples can be thawed more quickly due to the increased temperature applied, whilst ensuring a safe internal temperature for the sample. This is due to the temperature drop across the container wall which ensures that the biological matter will experience a lower, safe, peak temperature on the inner surface.

The inventors have thus developed a method of thawing samples where it is possible to control the temperature drop across the container wall. In a particular embodiment of the invention, the temperature drop can be differentially controlled across different regions of the container wall.

In this way, the present invention therefore addresses a need for methods of thawing samples through targeted application of heat to different positions on the external surface of a container, and also a need to achieve relatively fast thawing through precise control of the temperature drop across a container wall to ensure biological matter experiences a lower, safe, peak temperature across the whole of the sample region.

The inventors have further developed an apparatus which may be applicable to the method of the invention for thawing samples (e.g. frozen biological samples) in which heat applied to the biological sample material or regions thereof can be targeted as a function of heating time; ice fraction within the sample; spatial location of the ice fraction; or any combination thereof.

To further decrease thaw times, it will be appreciated that agitation of a sample may be effective. In addition although the above described methods can reduce the thaw time of a sample it will be appreciated that when a sample material is heated via power/heat applied across a container wall, the material proximal to the wall will warm more quickly than that in the interior of the sample (i.e. with the greatest distance from a wall), which reduces heating power of the system. Agitation of the sample material within the container can be used to address this issue. Particularly, agitation of the material may allow different portions of the material to contact the container wall at different times, ensuring that the product will thaw more quickly, and specific portions of the sample will be prevented from absorbing too much damaging heat.

Efficient agitation of the liquid component of a container is dependent on numerous factors. For example, for the simple case of free fluid in a cylindrical well, it is known that for efficient mixing;

$$n^2 r_0 > \frac{\sigma D_w}{8\pi V_f \rho r_0}$$

where n is the shaking frequency, the amplitude $r_0$, surface tension σ, well diameter $D_W$, microplate fill volume $V_F$ and fluid density ρ. Thus, to achieve good mixing, the only externally controllable variables are the amplitude of oscillation, $r_0$ and frequency, n.

However, although agitation can be used to decrease thaw times of samples, over agitating a sample can cause cellular damage by shearing. In this regard, it is known that there is both a lower and upper limit for the amplitude and frequency that can be selected for a given geometry, where too high a frequency and or amplitude may result in overly agitating a sample such that the contents of the container are treated too harshly resulting in cellular damage (e.g. by excessive shearing). This creates a window of operation for this idealised case whereby to achieve efficient mixing the selected amplitude and frequency of orbital oscillation have defined limits, within which good mixing occurs without excessive shearing, and outside of which poor, or no mixing occurs, or at the other extreme, excessive cellular damage by shearing results. In the case of heating a fully liquid phase system it is possible to tune the system to operate with parameters to achieve good mixing, as is implemented in numerous heater/shaker systems. However, during the phase transition from solid to liquid, differing ice-fractions within the container present a constantly modifying geometry within the system.

The equation above demonstrates how geometry (in the microwell example, $D_w$) has a direct impact on the conditions in which good mixing will occur. By varying the physical agitation of the sample in such a way as to optimise for the geometry of free liquid composition within the container, improved agitation of the free liquid components can be achieved, increasing the thermal power that can be supplied to the system, increasing the thawing speed whilst minimising cell damage. In this regard, the inventors have identified that agitating a sample as a function of its ice fraction and container type and/or sample volume can minimise cellular damage by shearing, whilst decreasing thaw times compared to thaw methods without agitation.

SUMMARY OF THE INVENTION

Thus, according to a first aspect of the invention there is provided a method of thawing a sample, wherein said sample is comprised within a container, the method comprising the steps of:
 a) calculating an agitation program as a function of i) either or both of the sample volume and the container type, (ii) the ice fraction in the sample, and (iii) optionally the thermal conductivity of the sample container;
 b) agitating said sample according to the program to agitate at least one region of the sample; and
 c) changing the agitation program applied to at least one region of the sample in response to changes in the sample volume and/or the ice fraction in said sample.

Steps b) and c) may be repeated at least one, two, three, four, five or more times. The number of repeats may be dependent for example, on the sample volume and on the temperature of the sample at the beginning of the method. Further, the number of repeats may be dependent on the external temperature used to thaw the sample. In a particular embodiment, the agitation program may be continuously changed and/or maintained in response to the changing ice fraction in the sample and/or in response to any changes in the sample volume. Thus steps b) and c) may be performed simultaneously, although separate and sequential steps may also be carried out in some instances. Reference to "continuously" changing or altering the agitation program means changing the agitation program at least every 30, 25, 20, 15, 10, 5, 4, 3, 2, or 1 seconds. The interval between each change in agitation may be fixed, where for example the agitation is checked and changed at least every 30, 25, 20, 15, 10, 5, 4, 3, 2, or 1 seconds or the interval may vary between changes in the program, e.g. intervals of any one of at least 1, 2, 3, 4 or 5 seconds may be used interchangeably. Alternatively, the interval may vary between each change in agitation, depending on the physical characteristics of the sample, e.g. the agitation may be changed when a particular ice fraction is present in the sample, e.g. when the sample is less than 99, 95, 90, 85, 80, 75, 70, 65, 60, 55, 50, 45, 40, 35, 30, 25, 20, 15, 10 or 5% ice in volume, or particularly, wherein less than 99, 95, 90, 85, 80, 75, 70, 65, 60, 55, 50, 45, 40, 35, 30, 25, 20, 15, 10 or 5% of the water in the sample is ice.

Particularly, the steps are repeated or the agitation program continuously changed until the sample contains no ice or less than 20, 15, 10 or 5% of the water in the sample is ice. Alternatively, the steps may be repeated until the sample reaches a desired temperature, e.g. at least 2, 3, 4, 5, 10, 20, 30 or 37° C.

Thus, the inventors have discovered that the amount of agitation of a sample to be thawed should be varied in accordance with its volume and its frozen or ice fraction, in order to minimise shearing of biological material within that sample and/or to decrease thaw times. In this respect, in a sample where 100% of the water is ice (or alternatively viewed, said sample has no liquid water), agitation may not be critical and thus may or may not be carried out. This is particularly the case when the sample is solid, i.e. comprises no free liquid. (For samples comprising only aqueous components, such samples may be solid when 100% of water is ice. For samples comprising, for example, cryoprotectants together with biological matter, these may be completely solid when vitrified, i.e. when at temperatures below the glass transition temperature of the cryoprotectant. Thus, the amount, type or frequency of agitation carried out at this point is not critical to the degree of shearing which may occur or to the thaw time of the sample. However, as the sample begins to thaw and a small amount of liquid water is present in the sample (e.g. at least 1, 2, 3, 4, 5, 10, 15 or 20% of the water is non-frozen or is liquid water, for example between 1-20% of the water is liquid water), vigorous agitation may be desirable. As the liquid water or non-frozen fraction of the sample increases (e.g. at least 50, 60, 70, 80 or 90% of the water in the sample is liquid water), it may be desirable to reduce the amount, or frequency of agitation, and thus to agitate the sample less vigorously. Typically, a sample that is vigorously agitated is agitated, e.g. by orbital rotation, at a frequency that is at least 1.5, 2, 3, 4, 5, 10, 50 or 100 times higher than that which is applied to a sample that has at least 50, 60, 70, 80, 90 or 100% liquid water. Less vigorous agitation refers to agitation which is at least 1.5, 2, 3, 4, 5, 10, or 100 fold lower than that which is applied to a sample with a small amount of liquid water present e.g. between 1-20% liquid water.

The method may include further steps before step a), for example, a step of determining one or both of the container type and the volume of sample. The "container type" refers to the type of container used, several examples of which are discussed further below, e.g. bags, vials etc. The container type may alternatively or additionally refer to the volume of the container used. This information may be determined from the manufacturer or by measuring the amount of liquid which it may hold. The sample volume may be determined by optical techniques (both in visible and other wavelengths such as IR) or by calorimetry. Additionally, a step of determining the thermal conductivity of the sample container may be carried out. A skilled person would be aware of methods which could be used to calculate the thermal conductivity of a sample container, and could for example pulse a known amount of energy into a sample container and determine how it responds, e.g. it could be measured how quickly the wall temperature is elevated and how quickly the temperature decreases, where the faster the decrease, the higher the thermal conductivity.

In order to carry out the method of the invention, it may be desirable to use an agitation device. In a particular embodiment, the sample, or more specifically, the container comprising the sample may be placed into a sample thawing vessel comprising an agitation device. For example, the thawing vessel may be a heated sample plate which has a mechanism for orbital rotation (agitation device). Typically, both the frequency and amplitude of agitation, e.g. rotation can be controlled.

The method of the invention may further comprise a step of monitoring the sample volume and/or the ice fraction in the sample, preferably during or after the step of agitating the sample. In a particular embodiment, the method therefore comprises the steps of:
a) providing a sample thawing vessel comprising a sample agitation device;
b) introducing a sample into the thawing vessel
c) optionally determining the thermal conductivity of the container;
d) determining one or both of the container type and the volume of the sample;
e) calculating an agitation program as a function of (i) either or both of the sample volume in said container and the volume of the container, (ii) the ice fraction in the sample, and (iii) optionally the thermal conductivity of the container;
f) activating the agitation device according to the program to agitate at least one region of the sample;
g) monitoring the sample volume and/or the ice fraction in the sample and
h) changing the agitation program applied to at least one region of the sample in response to changes in the sample volume and/or in the ice fraction of the sample.

In this embodiment, steps c) and d) may be performed in any order and may be performed before step a) or step b). Further, as discussed above, steps to h) may be repeated a number of times e.g. at least one, two, three, four or five times, and particularly may be carried out continuously, until the sample is thawed (i.e. until no ice remains or until less than 20, 10, 5% of the water is ice or less than 20, 15, 10 or 5% of the sample is ice) or until the sample reaches a desired temperature. Additionally, step g) may be performed during or after step f). Particularly, steps g) and h) may be carried out simultaneously to step f).

The term "sample" as used herein refers to any sample type and particularly includes a sample comprising biological material, e.g. a cellular sample. The sample may comprise material such as a biopharmaceutical; cellular material; biological tissue; biological organ or part thereof; a nucleic acid; or a polypeptide or amino acid, for example. In some embodiments the sample may comprise a food product.

The sample may further comprise a cryoprotectant, which is a substance used to protect biological material from freezing damage (e.g. due to ice crystal formation). Cryoprotectants generally function by increasing the solute concentration in cells and preferably are not toxic to cells (or have minimal toxicity). Cryoprotectants may lower or reduce the glass transition temperature of a biological material within a sample and may allow vitrification of a material without ice crystal formation. Cryoprotectants may also displace water molecules forming hydrogen bonds with biological molecules and thus may replace the water molecules in the biological material.

The sample used herein may comprise a mixture of cryoprotectants i.e. more than one cryoprotectant.

Typical cryoprotectants include glycols e.g. ethylene glycol, propylene glycol and glycerol, and dimethylsuphoxide (DMSO), sugars e.g. trehalose, sucrose, and as indicated above, these can be used in isolation (i.e. singly) or in combination.

Generally, if a sample comprises a cryoprotectant, between 1-30% of the sample may be cryoprotectant, e.g. between 1-20% or 5-15%.

The sample to be thawed in a method of the invention is typically "frozen". A "frozen" sample generally refers to a sample where at least 10, 20, 30, 40, 50, 60, 70, 80, 90 or 100% of the water in the sample is in the form of ice. Alternatively viewed, a frozen sample may contain no liquid water, or less than 90, 80, 70, 60, 50, 40, 30, 20, 10 or 5% of the water is liquid water.

Thus, in a frozen sample, some non-frozen material (liquid water) may be present (and thus a frozen sample includes a partially frozen sample), but typically, the non-frozen material or liquid water is less than 90, 80, 70, 60, 50, 40, 30, 20, 10 or 5% of the sample volume.

"Frozen" material generally refers to material which has been exposed to a low enough temperature to result in ice crystal formation. "Freezing" thus refers to a phase transition of liquid water to ice. A frozen sample will thus comprise at least some solid material.

"Non-frozen" material generally refers to material which does not comprise ice crystals.

As discussed above, a frozen sample may have 100% of its aqueous components or water present as ice. Such a frozen sample may be solid, when 100% of the water is present as ice, if that sample only comprises aqueous components. However, in one aspect of the invention, it is possible for the sample to additionally comprise one or more cryoprotectants, which generally have a glass transition temperature below that of the melting point of ice. In such samples, it is therefore possible that although 100% of the water may be in the form of ice, for the sample not to be completely solid, e.g. to have two phases of ice and a freeze concentrated solution, when the sample is present at temperatures between the glass transition temperature of the cryoprotectant and the melting temperature of ice. Samples comprising both aqueous components and for example a cryoprotectant will be solid at temperatures lower than the glass transition temperature. The process of forming a glass is known in the art as vitrification.

Frozen samples thus include samples comprising cryoprotectants which are above, at or below the glass transition temperature of the cryoprotectant, as long as the proportion of water defined above is present as ice.

Reference to "water" as used herein includes both water as liquid water and water as ice.

In a particular aspect of the present invention, the sample used in the thaw method may be solid and may comprise no free liquid or non-frozen material, i.e. may be below the glass transition temperature when a cryoprotectant is present or may be below the melting temperature of ice, when only aqueous components are present in the sample.

The ice fraction within a sample is the fraction of the water comprised in a sample that is present as ice. Thus, the ice fraction is the % of water which is present in a sample as ice. The amount of water in a sample is the total amount of water present, both as liquid water and as ice.

There are a number of methods known in the art to determine the amount of ice (i.e. the ice fraction) in a sample and a skilled person could apply any such method to calculate the amount of ice in a method of the invention. Particularly, the ice fraction can be determined as a function of direct temperature measurement, by calorimetry based deduction or by light transmission. Particularly, the ice fraction may be determined from reviewing a look-up table for a particular sample, where the ice fraction that remains at a or each particular temperature is predetermined. Thus, the measurement of sample temperature may be used to directly indicate the amount of ice fraction remaining during thawing. Further, the ice fraction can be determined in a similar way from a look up table for a particular sample, based on the amount of energy that has been applied to that sample, where that particular amounts of energy are known to increase the temperature of a sample to a particular level, which is associated with a particular ice fraction.

In some embodiments the method may comprise providing a sample e.g. a cryopreserved sample with an initial temperature of no more than −100° C., −90° C., −80° C., −70° C., −60° C., −50° C. or −40° C. The temperature of the sample will increase during the method of thawing of the invention.

The term "thaw" or "thawing" as used herein refers to the process of converting ice to liquid water. The term "thawing" can alternatively be referred to as "melting". The thawing of a sample occurs at or before its melting temperature and typically between its glass transition temperature (Tg) and its melting temperature (Tm).

The agitation program calculated in the method of the invention may involve selecting a particular type of agitation (e.g. vibration, shaking, stirring, rotating, rolling, squeezing, displacing, prodding, flexing etc.), at a particular frequency and/or amplitude, (e.g. from 0.1 to 10 mm and from 0 to 4000 rpm for orbital motion for vials and a linear push of the bag thickness for bag containers, (from 0-20 mm, typically from 6-10 mm, particularly 8 mm) to squeeze fluid) and/or for a particular time period e.g. from at least 10, 20, 30, 40, or 50 seconds to at least 1, 2, 3, 4, 5, 6, 7, 8, 9 or 10 minutes. The particular agitation program initially selected for a given sample will depend on the sample which is initially provided, i.e. on the ice fraction in the sample and on the container type/volume and/or the volume of sample material (and optionally on the thermal conductivity). Alternatively or additionally, the container, e.g. its volume and geometry will dictate the required agitation. Particularly, where the container is a vial or tube, orbital agitation may be adopted and where the container is a bag, squeezing, displacing, prodding and/or flexing may be adopted.

As discussed previously, the agitation program may change over the course of the thaw of the sample. Particularly, when the sample is frozen, e.g. has 100% of its water as ice or no liquid water, any agitation can be used (e.g. type, frequency etc.) that is appropriate for the container. This is particularly the case where the sample is solid, i.e. for aqueous samples 100% of water is present as ice, or for samples with cryoprotectants, samples at or below the glass transition temperature. Thus at this point, the agitation used is not thought to have any detrimental effect to the shear and/or thaw time of the sample. It is possible that no agitation is used at this point. As the sample begins to thaw and the amount of ice decreases (or alternatively viewed, the amount of free liquid, e.g. liquid water increases), the agitation frequency, amplitude or amount is increased. Thus, for example, when the amount of liquid water present in the sample is at least 1, 2, 3, 4, 5, 10, 15, or 20% of the total water amount, the sample may be agitated vigorously, e.g. at least 500, 1000, 2000, 3000 or 4000 rpm for a tubular or vial container. However, when the level of free liquid (water) reaches a particular level e.g. at least 50, 60, 70, 80 or 90% (or the level of frozen material decreases to a particular level), it may be desirable to decrease the amount or frequency of agitation e.g. to less than 1000, or 500 rpm for a tubular or vial container. Such programs may ensure that the shearing of biological matter is reduced during the thaw process whilst maintaining a reduced thaw time to ensure cell viability.

Thus, as discussed above, as the sample thaws, the agitation program will change to take into account the changing ice fraction and the sample volume. As indicated above, any one or more of the above described variables of the agitation program may be altered, e.g. the type of agitation, frequency, amplitude, and/or time.

The "container" as used herein may be any container in which a sample may be placed. Typically the container will be a container in which a sample can be placed to freeze the sample, and thus typically the container will be able to exist at low temperatures, e.g. at temperatures of −196° C. (the temperature of liquid nitrogen). A container may be a tube, vial, bag, plate, straw or any other known container which can comprise a sample. Particularly, the container may be a screw capped cryovial, a hermetically sealed cryovial, a flexible bag, a multiwall plate, a matrix tube or a straw. The container may be able to hold any volume of sample and the present methods of the invention can be employed regardless of the volume of the container. However, in a particular embodiment of the invention, the container may have a capacity of at least 50 μl, 100 μl, 0.2 ml, 0.3 ml, 0.4 ml, 0.5 ml, 1 ml, 2 ml, 5 ml, 10 ml, 50 ml, 100 ml, 500 ml or 1000 ml. Further, as indicated above, the container may be made of any material, although preferably from a material that can exist at low temperatures (e.g. at −196° C.). The walls of the container may be of any thickness, e.g. from 0.5 mm, 1 mm, 2 mm, 3 mm or 4 mm in thickness. Particularly, when the container is a bag, the wall thickness may be less than 0.5 mm, e.g. less than 400, 300, 200, 100, 50, 40, 30, or 20 μm.

The container may comprise any volume of sample and may or may not be filled to its capacity with sample. The container may therefore only be partially full. In this instance, the sample may comprise at least 1, 5, 10, 15, 20, 25, 30, 35, 40, 45, 50, 55, 60, 65, 70, 75, 80, 85, 90, 95 or 100% of the volume of the container.

Further, as indicated above, "at least one region" of the sample may be agitated. Therefore, it is possible in the present invention for only a portion or part of the sample to be agitated, and it may not be necessary to agitate the whole sample in any particular agitation step. In this regard, the initial agitation of the sample may comprise agitation of a single region of the sample, multiple regions of the sample (which may be separated spatially or according to the ice fraction of each region), or the whole sample. Thus, the sample may be differentially agitated spatially and/or temporally and this may change as a function of the ice fraction and/or sample volume. In this regard, one or more regions of the sample may be agitated in a particular agitation program and the same or different regions of the sample may be agitated in a subsequent agitation program, determined according to the above discussed variable. Thus, different regions of the sample may require agitation at different times in the method. In one embodiment, at least 1, 2, 3, 4, 5, 6, 7, 8, 9, 10, 50, 100, 200, 300, 500 or 1000 discrete regions of a sample may be agitated in any particular agitation program.

Particularly, the agitation of discrete regions may be carried out where the container is a flexible container, such as a bag, where pressure can be applied to discrete regions of the bag. As discussed above, the change in agitation applied to the at least one region of the sample may comprise changing the frequency, amplitude or both frequency and amplitude of the agitation. The agitator device may comprise at least one agitation device, and there may be two or more agitation devices which may be spatially separated around and/or along the thawing vessel in order to enable differential spatial agitation of different regions of the vessel. As indicated above, where the container is flexible, a plurality of agitators may be used to apply pressure to different regions of the container at the same or at different times during the thaw process.

In some embodiments the sample thawing vessel which may be used in a method of the invention, may further comprise a sample heating device, where the sample may be heated at the same time or separately to the agitation step. Particularly, where the step of calculating the agitation program may comprise calculating both a heating and agitation program as a function of the volume of the sample and/or container type, optionally the thermal conductivity of the sample and the ice fraction; the step of agitating the sample may comprise additionally heating the sample according to the heating program to heat at least one region of the sample; and the step of changing the agitation program may comprise changing the heating program applied to at least one region of the sample in response to changes in the sample volume and/or ice fraction in the sample. The heating of the sample may change continuously during the thaw of the sample.

Heating of the sample in may comprise heating a single region of the sample, multiple regions of the sample (which may be separated spatially or by differences in sample ice fraction in different regions) or the whole sample. Thus, the sample may be temporally and/or spatially differentially heated and this may change depending on the ice fraction in the sample and on sample volume. In this regard, one region of the sample may be treated in accordance with a particular heating program and the same or different regions may be heated in a subsequent heating program. Thus, different regions of the sample may need to be heated at different times. In one embodiment, at least 1, 2, 3, 4, 5, 6, 7, 8, 9 or 10 discrete regions of a sample may be heated in any particular heating program.

The heating device may comprise at least one heating element such as a thermal transfer device within or connected to the inner wall of the thawing vessel, and there may be a plurality of heating elements which may be separated spatially around the vessel laterally or radially around the wall, or separated vertically up the vessel wall. There may be a plurality of thermal transfer devices in the form of electrically conductive or resistive devices. There may be a plurality of thermal transfer devices embedded at different vertical positions up the vessel wall, such as electrically resistive heating bands, for example. The heating bands may be in the form of rings (which may be fully joined), which may have an undulating or serpentine profile.

As discussed above, the present method of the invention can result in reduced shearing of a sample, particularly a biological sample, e.g. a cellular sample during the thawing process. In this respect, alternatively viewed, the present invention further provides a method of reducing shearing during the agitation of a sample comprising:
 a) calculating an agitation program as a function of i) either or both of the sample volume in said container and the type of container, (ii) the ice fraction in the sample and (iii) optionally the thermal conductivity of the container;
 b) agitating said sample according to the program to agitate at least one region of the sample; and
 c) changing the agitation program applied to at least one region of the sample in response to changes in the sample volume and/or sample ice fraction.

In this aspect, the method particularly reduces the shearing to the sample, particularly a cellular sample, by at least 5, 10, 15, 20, 25, 30, 35, 40, 50, 60, 70, 80 or 90% compared to a method where agitation is not calculated and/or altered based on the sample volume and/or container type/volume and based on the ice fraction, e.g. where a continuous agitation program is applied to a sample, i.e., the same type of agitation at the same frequency regardless of the change in ice fraction in a sample.

The term "shearing" as used herein refers to any damage (particularly mechanical damage) caused to a sample, particularly to a cellular material comprised within a sample, as a result of agitation. Particularly, shearing refers to damage to the cell membrane of a cell, which may or may not result in lysis of the cell. A reduction in the amount of shearing which may occur to a cellular sample therefore may relate to a reduction in cell membrane damage which occurs and/or a reduction in cell lysis which occurs within a sample (e.g. a reduction of at least 5, 10, 20, 30, 40, 50, 60, 70, 80 or 90% in cell membrane damage and/or in cell lysis). The amount of cell shearing may be determined by direct cell counts on thawed samples, or alternatively release of intracellular components such as lactate dehydrogens may be monitored using standard colorimetric assays.

In a preferred embodiment, the methods of the invention may additionally result in a reduction in thaw time, compared to methods where samples are not agitated or are not agitated based on the ice fraction and the sample volume and/or container type/volume or with respect to the below methods concerning heating, compared to methods where the outer surface of a container is only exposed to temperatures at which cellular damage would not be expected to occur. Particularly, thaw time may be decreased by at least 5, 10, 15, 20, 30, 40, 50, 60, 70, 80 or 90%.

As discussed previously, the inventors have identified a further method which may result in a reduction of thaw time for samples, particularly for biological samples. In this respect, the inventors have identified that it is possible to heat the external wall of a container comprising a sample to above a temperature which would normally be associated with causing cellular damage e.g. above 37° C., whilst keeping the internal wall temperature below a temperature which would cause cellular damage e.g. below 37° C. In this way, it is possible to decrease thaw time, without exposing the sample to a temperature which is thought to cause cell damage.

In this regard, a second embodiment of the invention provides a method of thawing a sample wherein said sample is comprised within a container, said method comprising heating at least one region of the outer wall of said container to a temperature equal to or above that at which cellular damage can occur and wherein the inner wall of the container is at a temperature lower than that at which cellular damage can occur.

Thus, the inventors have identified in this aspect that the temperature of the inner surface or wall of a container may be lower than the temperature of the outer surface or wall of a container. The relationship between the temperature of the inside of the container and the outside of the container may depend upon several factors, including the thickness of the container wall and the material from which the container wall is manufactured. Further, the temperature and/or volume of sample within the container may affect the temperature differential between the outer and the inner walls of the container.

Reference to a "temperature equal to or above that at which cellular damage can occur" refers to a temperature at or above which at least 10, 20, 30, 40, 50, 60, 0, 80 or 90% of the cells in the sample at that temperature are damaged, e.g. are non-viable and/or, have damaged DNA and/or proteins, Alternatively viewed, such a sample may have an increase in non-viable cells and/or in DNA damaged cells of at least 5, 10, 20, 30, 40 or 50% compared to a sample which is at a lower temperature, i.e. which has not been exposed to a temperature equal to or above that at which cellular damage can occur. Methods to measure cellular damage are well known in the art and include direct cell counts, and the monitoring/measuring of the release of intracellular components.

For a biological sample, typically, the temperature equal to or above which cellular damage can occur is 37° C., e.g. 38° C. and samples with or exposed to temperatures in excess of 37° C. would generally experience some cellular damage. However, the temperature equal to or above which cellular damage may occur may vary from sample to sample. For example, it may be possible to thaw biological samples of thermophilic bacteria at much higher temperatures than for example human tissue.

In one aspect, the outer wall of the container may be heated to a temperature of at least 37° C., e.g. at least 40, 50, 60, or 70° C. Generally, the thicker the container wall, and/or the lower the temperature of the sample, the higher the temperature that can be used to heat the outer surface of the container without causing cellular damage to the sample within the container.

Reference to a temperature which is lower, less than or below that at which cellular damage can occur refers to a temperature at which less than 10, 5, 4, 3, 2, or 1% of the cells in a sample at that temperature are damaged, e.g. have damaged DNA, proteins and/or are non-viable. Particularly compared to a sample which is exposed to a temperature at or above that at which cellular damage can occur, the sample may have a reduction of at least 50, 60, 70, 80 or 90% in the amount (e.g. percentage) of damaged cells present.

It will be appreciated by a skilled person that the temperature to which the outer wall is heated may vary during the method of thawing the sample. Typically, as the sample thaws, the temperature will be reduced to prevent cell damage (i.e. as the internal sample temperature increases).

Further, in this aspect, at least one region of the outer wall of the container is heated to a temperature equal to or above that at which cellular damage can occur. Thus, it is not necessary to heat the whole container at the defined temperature in the method of the invention. Hence, particularly, one or more regions may be heated at a temperature at or above which cellular damage may occur, e.g. at least 1, 2, 3, 4, 5 or 6 regions. In a further aspect, the whole container may be heated. In a particular embodiment, it may be desirable to heat the outer wall region, the corresponding inner wall region to which is in contact with the sample, to a temperature at or higher than that at which cellular damage can occur, whilst the outer wall region, the corresponding inner wall region to which is not in contact with the sample, is not exposed to a temperature at or higher than that at which cellular damage can occur, e.g. is only exposed to a temperature at which cellular damage would not occur.

In connection with this aspect, the invention further provides a method of thawing a sample comprised in a container, the method comprising:
heating the container such that an outer wall region of said container, the corresponding inner wall region of which contacts the sample, is heated to a temperature higher than an outer wall region, the corresponding inner wall region of which does not contact the sample.

Thus, according to this embodiment, it is possible to differentially heat a container, where a higher temperature may be applied to the outer (or external) container wall, the corresponding inner wall to which is in contact with the sample, compared to the outer container wall, the corresponding inner wall to which is not in contact with the sample. Particularly, in this method, the container may only be partially filled with sample, ensuring the presence of an inner wall region which is not in contact with the sample, e.g. the inner wall region which is above the sample in the container.

Differential heating of a container may be carried out using an apparatus of the invention as described below, e.g. an apparatus which has a plurality of spatially separated heating elements, or which has a means for laterally or vertically moving the sample container so that only a portion of that container is exposed to heat produced by a heating element in the apparatus. Thus, as discussed below, it may be possible for a container to be inserted into the apparatus so that only a portion of the container is in the apparatus and a portion of the container is outside of the apparatus. In this way, only the portion within the apparatus will be heated (e.g. preferably the portion of the container in contact with the sample), providing differential heating of the sample container. Alternatively, it may be possible for a container to be rotated within an apparatus of the invention so that only one portion is exposed to a heating element within the device.

Particularly, it is possible to differentially heat a sample container, where a temperature which would usually be associated with causing cellular damage can be applied to a portion of the outer wall of the container, the corresponding inner wall region to which is in contact with the sample, without the inner wall region and/or the sample reaching a temperature at which cell damage could occur.

Thus, the frozen nature of the sample (and the temperature differential across the container wall) ensures that the sample and/or inner wall in contact with the sample remains at a temperature which is below that which could cause cellular damage to the sample. When the sample is still frozen, it is possible that the inner wall which is in contact with the sample may be at a temperature at or higher than that which would cause cell damage. In this instance, the sample itself will preferably not reach a temperature that is at or higher than that which would cause cell damage. Further, in a particular embodiment, the inner wall in contact with the sample may be heated to the same or to a similar temperature as the inner wall not in contact with the sample, in spite of the increased temperature which is applied to its corresponding outer wall.

The invention may therefore preferably provide, a method of thawing a sample comprised in a container; the method comprising heating the container such that an outer wall region of said container, the corresponding inner wall region to which is in contact with the sample, is heated to or above a temperature at which cellular damage can occur, whilst an outer wall region of said container, the corresponding inner wall region to which is not in contact with the sample, is at a temperature below that at which cellular damage can occur. In this embodiment, as discussed previously, the inner wall regions in contact and not in contact with the sample (e.g. above the sample) may be at the same or a similar temperature.

Reference to an outer wall (interchangeably referred to as an external wall) refers to the outside surface of a container which comprises a sample. The outer wall may indirectly contact the sample or not indirectly contact the sample (indirect contact means that the corresponding inner wall region is in contact or not in contact with the sample, respectively). Reference to an inner wall refers to the inside surface of a container which comprises a sample. The inner wall may contact the sample or not contact the sample (e.g. the inner wall above the sample (e.g. in a partially filled container) will not be in contact with the sample).

Reference to the corresponding inner wall region of an outer wall region, refers to the inner wall region at the same position on the inner surface of the container as the outer wall region on the outside surface of the container. Further, reference to the corresponding outer wall region of an inner wall region refers to the outer wall region at the same position on the outer surface of the container as the inner wall region on the inside surface of the container.

As described in the method, the inner wall regions in contact with the sample and not in contact with the sample may be at the same or similar temperatures. A "similar" temperature may refer to a temperature which is at least within 10, 5, 4, 3, 2, or 1° C. Thus, the inner wall surface in contact with the sample may be at a temperature which is less than 10° C. (e.g. less than 5, 4, 3, 2, or 1° C.) different to the temperature of the inner wall surface which is not in contact with the sample.

It will be appreciated by a skilled person that the heat applied to the outer wall of the container, the corresponding inner wall region of which is in contact with the sample, may be altered as the sample thaws and thus as the temperature of the sample increases. Particularly, the temperature to which the outer wall of the container, the corresponding inner wall region of which is in contact with the sample is heated, may decrease as the sample thaws.

Thus, in this regard, the method may comprise a step of monitoring the temperature of the inner wall region contacting the sample material and the inner wall region not contacting the sample (e.g. above the level of the sample material) and adjusting the heat or energy applied to one or both of the outer wall regions of the sample container in response to changes in the differential temperature of the two regions. Alternatively or additionally this step may comprise monitoring the sample temperature and adjusting the heat or energy applied to the outer wall region the corresponding inner wall region of which contacts the sample, such as reducing the heat applied in order to reduce the temperature of the inner wall region contacting the sample material.

This step may also comprise monitoring the temperature of the sample material and/or monitoring the ice fraction and adjusting the heat or energy applied to the sample container in response to changes in the ratio.

This step may comprise differentially heating spatially separated areas of the inner wall region contacting the sample material in response to changes in the difference in temperature between the two inner wall regions, the difference in the ice fraction, the current temperature of the inner wall region contacting the sample material or any combination thereof.

The step may comprise monitoring the temperature of the two inner wall regions and/or monitoring the spatially separated areas of the inner wall contacting the sample material using any suitable means, which may be selected from:

1) one or more temperature sensors embedded in or connected to the inner wall of the vessel;
2) one or more infra-red emission sensors, arranged to detect infra-red emissions emanating from the outer surface of the vessel;
3) confocal techniques to focus on the temperature inside the vessel;
4) measuring the temperature of the outside wall of the container and using this measurement, together with the power which has been inputted to calculate inner wall temperature; and
5) one or more infra-red emission sensors arranged to detect infra-red emissions from spatially separated portions of the sample material.

The step may comprise continuously monitoring the two inner wall regions and/or spatially separated regions of the inner wall and the data produced used to control heating of the vessel and/or sample material spatially and/or temporally. The step may therefore be carried out at the same time as the heating of the sample.

The sample material may be biological sample material as described hereinabove for the first aspect of the invention.

The outer wall region of the container, the corresponding inner wall region to which is in contact with the sample may initially be heated to a temperature equal to or above that expected to cause cellular damage to a sample, e.g. to a temperature of at least 50° C., 60° C. or 70° C., and the outer wall region the corresponding inner wall region to which is not in contact with the sample may be heated to an initial temperature of between 20° C. and 40° C., such as around 37° C., or a temperature which is similar thereto, e.g. which is within at least 10° C. of that temperature, e.g. within at least 5, 4, 3, 2 or 1° C. Particularly, the outer wall region, the corresponding inner wall region to which is in contact with the sample may be heated to a temperature which allows the inner wall temperature to be within a range of 20 to 40° C., particularly 37° C. However, when the sample comprises a high fraction of ice e.g. at least 60, 70, 80 or 90% of the sample water is ice or alternatively viewed, less than 40, 30, 20 or 10% of the water is liquid water, it is possible to heat the inner wall to a temperature of more than 37° C. without causing cellular damage i.e. without the temperature of any part of the sample increasing to more than 37° C. However, if the inner wall in contact with the sample is heated to a temperature higher than 37° C. or higher than that at which cellular damage may occur, then it is preferred that the sample be agitated.

As discussed previously, the above methods of the invention may reduce the thaw time of a sample by allowing an increased temperature to be applied, e.g. to at least one region on the outer surface of a container, e.g. a temperature at or above which cellular damage would be expected to occur. Alternatively viewed, therefore, the present invention provides a method of reducing the thaw time for a sample, said method comprising heating at least one region of the outer surface of a container comprising said sample to a temperature equal to or above which cellular damage can occur, without inducing cellular damage in said sample.

"Reducing" the thaw time may include a reduction in thaw time by at least 5, 10, 15, 20, 30, 40 or 50% compared to a method wherein the outer surface of the container is heated to a temperature below which cellular damage can occur.

When the temperature of the sample material reaches a defined temperature, such as between −30 to 30° C., e.g. between −30 to 20, −25 to 20, −20 to 10, −20 to 5, −20 to 0, or −20 to −10° C., (or alternatively viewed, reaches a temperature of at least −20, −10, 0, 10, or 20° C. or at least 30° C.), the heat or energy applied to the outer wall region, the corresponding inner wall region to which is in contact with the sample may be reduced. Particularly, the temperature may be reduced when the sample reaches a temperature within the region of −25 to 0° C., e.g. within the region of −20 to −10° C. Reduction of the heat or energy applied may continue as the temperature of the sample material increases to a desired temperature. For example, reduction of the heat or energy applied to the outer wall region, the corresponding inner wall region to which is in contact with the sample may continue until the sample material reaches 37° C.

The above described methods of the second aspect of the invention may further comprise a step of agitation and particularly may be combined with the method of the first aspect of the invention.

According to a third aspect of the invention there is provided a sample thawing apparatus, comprising a heating vessel adapted to hold a container comprising a sample, in use, and a heating device comprising a means to differentially heat different regions of a held container, in use, such that at least a portion of the outer wall region of the container, the corresponding inner wall region to which contacts the sample, is heated to a higher temperature than the at least a portion of an outer wall region, the corresponding inner wall region of which does not contact the sample.

Thus, in accordance with the above described method, the apparatus of the third aspect is capable of differentially heating a container, and may achieve an inner wall temperature which is constant i.e. for both the inner wall contacting the sample and the inner wall not contacting the sample. Particularly, the apparatus may allow the differential heating of the container to achieve an inner wall temperature which is capable of thawing the sample, without causing cell damage and particularly, the maximal temperature possible in this respect. For biological samples, the container may be differentially heated to achieve an inner wall temperature at or similar to 37° C. Particularly, the device is capable of heating the at least a portion of an outer wall region, the corresponding inner wall region of which contacts the sample, to a temperature which would be expected to cause cellular damage.

As described above, the device is capable of heating the outer wall region of the container, the corresponding inner wall region to which contacts the sample, to a higher temperature than the outer wall region, the corresponding inner wall region of which does not contact the sample. Reference to a "higher temperature", refers to any increase in temperature to the outer wall region, the corresponding inner wall region to which contacts the sample, as compared to the outer wall region, the corresponding inner wall region to which does not contact the sample, e.g. an increase in temperature of at least 1, 5, 10, 20, 30, 40, 50, 60, 70, 80, 90 or 100° C. It is possible in this aspect for the outer wall region not in contact with the sample to not be heated.

The heating vessel may comprise a vessel wall in which is mounted, or to which is connected, the heating device.

The heating device may comprise a plurality of heating elements spatially separated on the vessel wall or may comprise a single heating element. The heating element may comprise heating bands separated vertically up the vessel wall, heating strips separating horizontally around the vessel wall, or a combination thereof. Alternatively, or additionally, the heating element may comprise a portion which is curved, or may be undulating in shape. The heating elements may be present as a continuous or non-continuous band around the vessel wall. The heating elements may comprise electrically resistive elements.

The heating device may comprise a radiative heating source arranged to apply radiative heating to the heating vessel. The radiative source may comprise an infra-red heating source. The means to differentially spatially heat a held container may comprise a plurality of shutters or windows in the vessel wall which may be selectively activated to enable or prevent transfer of radiative energy through the vessel wall at particular regions. This may be particularly useful where a single heating element is used in the device. Where radiative heating is employed, it is possible to achieve differential spatial heating of the container by focussing or imaging the radiative heat source onto the vial. Further, spectral control of the radiative heat source can be used to achieve differential heating.

The heating device may comprise a heated fluid conduit arranged to enable heated fluid to be applied to the spatially separated areas of the vessel wall. The heated fluid conduit may comprise a conduit embedded within the vessel wall, or may be connected thereto. The fluid conduit may comprise a series of spatially separated fluid pipes able to be selectively opened or closed to allow flow of heated fluid there through.

The heating device of the invention may comprise a means for moving the sample container to allow differential heating of the sample e.g. a means for laterally or vertically moving the sample container. The means may comprise a means for rotating the sample container, e.g. so that only a portion of the sample container is directly exposed to a heating element or is adjacent to a heating element, or a means for moving the sample container vertically in the device (e.g. to allow only a portion of the container (e.g. comprising or in contact with the sample) to be within the device).

The heating device may comprise one or more temperature sensors embedded in or mounted on the vessel wall, or may comprise infra-red emission sensors arranged to detect changes in infra-red emissions from different areas of the vessel wall and/or sample contained in a held container.

The apparatus may also comprise an agitation device which may be openable to provide, temporally and/or spatially differentiated agitation of a held sample container and/or sample material within a sample container. The agitation device may be as described for any of the first or second aspects of the invention, and may be arranged to change the oscillation frequency and/or amplitude applied to said sample container, sample or areas thereof in response to changes in the sample ice fraction, temperature of the sample material or areas thereof, temperature of a held container or regions thereof, or any combination thereof.

The apparatus may be used in the method of the second aspect of the invention to hold a container comprising a sample described for the second aspect and thaw the sample as described for the second aspect.

According to a fourth aspect of the invention there is provided a method of thawing a sample, the method comprising the steps of:

a) heating the sample to a temperature above its Tg but at which at least 70% of the sample water is ice, over a first time period; and
b) heating the sample to a temperature at or above the melting temperature of the sample, over a second time period;
wherein the first time period is longer than the second time period.

According to this aspect, the inventors have identified that the most detrimental period during the thawing process in terms of causing cell damage, which may affect cell viability, occurs during the thawing of the final portion of the ice fraction in a sample, e.g. the final 70% of the ice fraction. Generally, this final thaw occurs when the sample is heated at or above its Tm (e.g. at or above the Tm of the aqueous components e.g. water). During the initial heating phase, (e.g. the thawing of the initial 30% of the ice) cell damage is less likely to occur and thus this initial thaw can be carried out at a relatively slow rate, without having an effect on cell viability. The initial thaw is generally carried out a temperature which is equal to or greater than its Tg but is less than its Tm Reference to "Tg" as used herein refers to the glass-liquid transition or glass transition temperature of a sample, typically of a sample which comprises a cryoprotectant. The glass transition temperature is the temperature at which a freeze concentrated matrix (e.g. the sample comprising water, cells, cryoprotectants etc.) solidifies into a glass. Thus, generally, a sample maintained under its glass transition temperature will have no free liquid present, e.g. less than 10, 5 or 1% of the sample volume would be free liquid. The Tgs of well known cryoprotectants are known in the art, e.g. the Tg of DMSO is −124° C.

Reference to "Tm" refers to the melting temperature of the sample, e.g. of the aqueous components or of the combination of the cryoprotectant and aqueous components in the sample. The Tm of a combination of agents e.g. of cryoprotectant and aqueous components may be different to the Tm of either component alone, e.g. less than either alone. The Tm is the temperature at or above which the phase transition from solid to liquid is effected in the sample.

As discussed previously, at temperatures between the Tg and Tm, two phases may exist in the sample, particularly where a cryoprotectant is present. Thus an ice phase may be present, together with a freeze concentrated solution. At Tg, the formation of a glass may occur.

The first time period may be at least twice as long, three times as long, four times as long, five times as long or six times as long as the second time period, such as between four and six times as long. In some embodiments step b) comprises heating the sample to between −5° C. and 5° C., −5° C. and 3° C. or −5° C. and 2° C., between −5° C. and 1° C., or between −3° C. and 1° C.

In some embodiments the second time period is between 15 seconds and 10 minutes, 20 seconds and 120 seconds, 30 seconds and 120 seconds, 1 minute and 10 minutes, 1 minute and 5 minutes and 1 minute and 2 minutes. In some embodiments step b) comprises heating the frozen biological sample in a vessel comprising a resistive heating element to a temperature below −25° C., such as to around −30° C., for example.

In some embodiments the first time period is between 5 minutes and 30 minutes, 5 minutes and 25 minutes, 5 minutes and 20 minutes, 5 minutes and 15 minutes, or 10 minutes and 15 minutes.

There may be a further step c) of maintaining the biological sample at a temperature of between 0° C. and 5° C., such as around 4° C. Step c) may comprise heating the sample over a third time period which may be shorter than the second time period or longer than the second time period, but is preferably between 5 minutes and 15 minutes or between 5 minutes and 10 minutes.

Step b) may comprise heating the sample until substantially all of the aqueous components are in liquid form (i.e. all of the ice fraction is liquid water) and thus step b) may comprise heating the sample to effect phase change from solid to liquid of all aqueous components of the sample, e.g. at least 70, 80, 90 or 95% of the water of the sample is present as liquid water, or alternatively viewed, until less than 30, 20, 10 or 5% of the water is present as ice.

The temperature at which the aqueous components start transition from frozen to liquid will depend on the make-up of the frozen sample material including the composition of the solvents, solutes etc. in the sample but step b) may be performed such that the temperature reached is no more than −40° C., −35° C., −30° C., −20° C. or −15° C. in some embodiments.

Step b) may be performed for a time period sufficient to change all frozen aqueous components to liquid aqueous components.

Step b) may be performed by gradually increasing the temperature of the sample by increasing the heat or energy applied to the resistive heating element used in step a) over time.

The biological sample may be agitated during any or all of steps a), b) and c) and agitation may be performed such that the frequency and/or oscillation of agitation is changed as a function of at least one of sample temperature, thawing time period elapsed, and the ice fraction in the sample at any time point during the method.

In some embodiments, the method comprises thawing the biological sample in a vessel comprising a Peltier element, which is arranged to heat the sample during steps a) and b) and either heat or cool the sample during step c), depending on the temperature at which the sample is being maintained.

The method of the fourth aspect of the invention may be combined with the method of the first aspect of the invention or the second aspect of the invention. The method of the fourth aspect of the invention may comprise using the apparatus of the third aspect of the invention, and in this way a frozen biological sample may be provided in a container and placed in the apparatus of the third aspect of the invention before steps a), b) and optionally c) of the method of the fourth aspect of the invention are performed.

In all the methods of the invention, the thawed sample or substantially thawed sample may be stored at an appropriate temperature and in appropriate conditions after thawing. For example, it may be desirable to store material at low temperatures before subsequent use, e.g. at or below 10, 5 or 4° C. Alternatively, for cell culture, it may be preferred to incubate cells or material at 37° C., e.g. in culture media.

According to a fifth aspect of the invention there is provided a sample thawing or cooling apparatus comprising a vessel comprising a resilient vessel wall, arranged in use to hold a sample container, the resilient vessel wall being provided with at least one heating and/or cooling element, and wherein the resilient vessel wall is moveable between a first configuration in which it is biased onto a held container, in use, and a second configuration in which it is biased away from a held container.

The resilient vessel wall may be initially in the first configuration or second configuration and moved between configurations by way of an external stimulus or actuator.

In some embodiments the resilient vessel wall is initially in the first configuration and is moved to the second configuration in order to enable a container to be inserted into the vessel, before the wall returns to the first configuration. In such embodiments the wall may be moved from the first to the second configuration using suction on the vessel wall or through the application of negative pressure. For example, a vacuum could be used. The wall may then be released after insertion on a container, to move back to the first configuration, in which the vessel wall substantially contacts the container.

In other embodiments the resilient vessel wall is initially in the second configuration, and a sample container may therefore be inserted into the vessel. In such embodiments the wall may be moved to the first configuration by the application of pressure on the outside of the vessel wall, which may in some embodiments be applied to substantially the whole of the vessel wall.

There may be a plurality of heating and/or cooling elements, e.g. at least 2, 3, 4, 5, 6, 7, 8, 9 or 10, separated spatially around the vessel wall. Alternatively, a single heating and/or cooling element may be present. The or each heating and/or cooling element may be embedded within the wall or connected to the wall. The or each heating and/or cooling element may comprise a band extending around the vessel wall, and each band may be substantially linear, or may be undulating. The band may be continuous or non-continuous. The or each heating and/or cooling element may be a resistive heating element. Cooling may be achieved by thermal conduction from a cold sink. Particularly, the or each cooling element may be a resistance wire, which may be capable of conducting cold (i.e. a reduced temperature) from a politer. The cooling may be controlled by heating the wire.

The or each heating and/or cooling elements may be spaced apart from each other, e.g. to have a uniform distribution around the vessel wall. The apparatus may be able to differentially heat and/or cool a sample. In this regard, the apparatus may comprise one or more shutters or windows or other means to shield the sample container and/or sample from one or more of the heating and/or cooling elements.

The vessel may comprise an outer wall and an inner resilient vessel wall. The outer wall and inner wall may be separated from each other, such that a gap or airspace is formed there between.

The resilient vessel wall may be formed from an elastomeric material, which may comprise rubber, latex, silicone or the like, for example. The apparatus of the fifth aspect of the invention may be combined with the apparatus of the third aspect of the invention. The apparatus of the fifth aspect of the invention may be used in the method of any of the first, second and fourth aspects of the invention. Additionally and/or alternatively, the apparatus of the fifth aspect may be used to cool (i.e. to reduce the temperature of a sample). Cooling or a reduction in temperature refers to a reduction of at least 1, 5, 10 or 20° C. Particularly, the apparatus may be able to freeze a sample, i.e. to convert non-frozen material to frozen material, e.g. the device could be used to freeze a liquid sample, such as a drink.

In this application the term "aqueous components" means water.

DETAILED DESCRIPTION OF THE INVENTION

In order that the invention may be more clearly understood embodiments thereof will now be described by way of example only with reference to the accompanying drawings of which:

FIGS. 2a and 2b illustrate cross-sectional views of the biological sample thawing and/or cooling apparatus of FIG. 1 with an inserted sample container;

Figure 1:
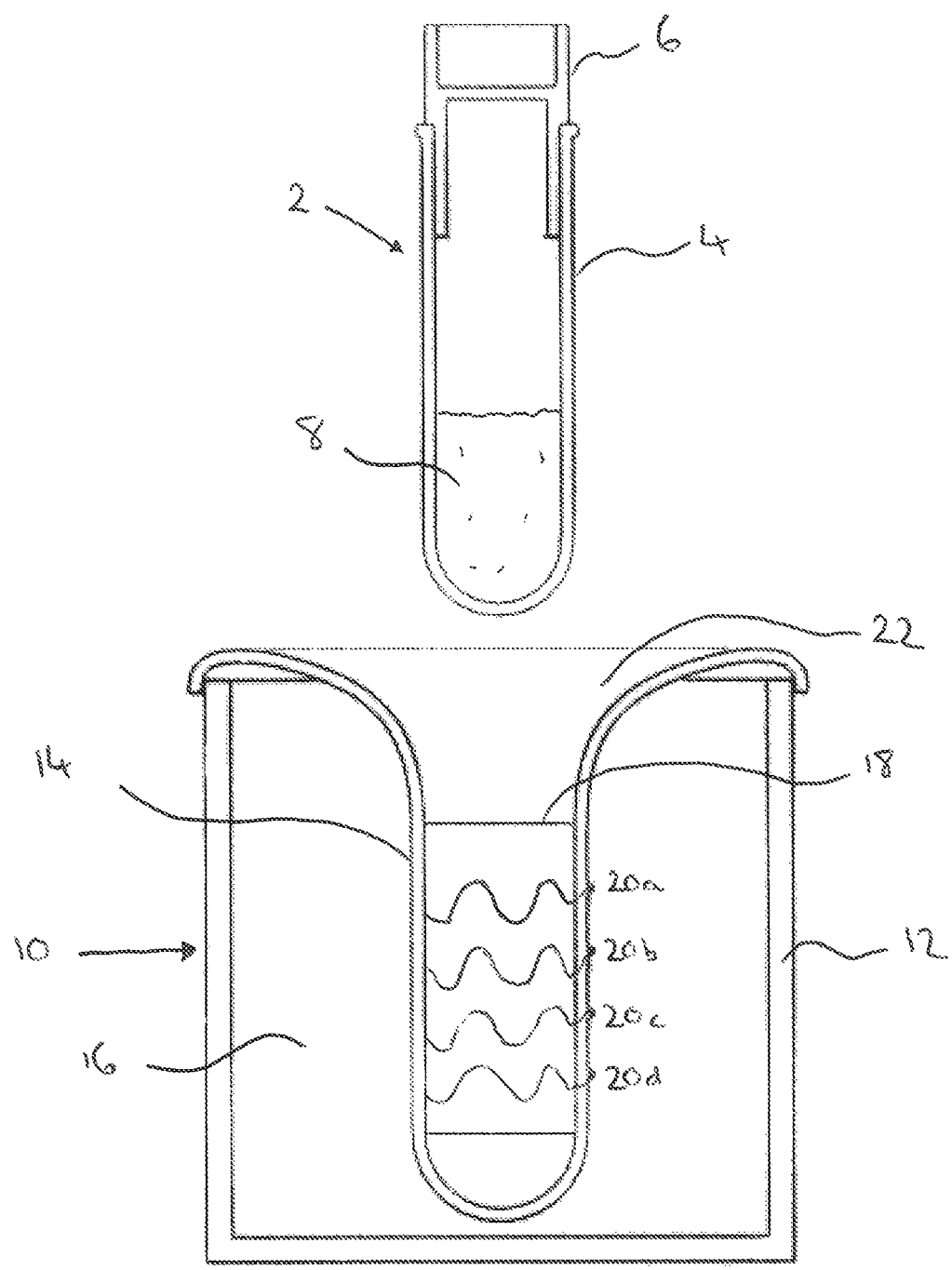
FIG. 1 illustrates a sample thawing and/or cooling apparatus of the third and fifth aspects of the invention with a biological sample container there above.

An embodiment of a sample thawing and/or cooling apparatus of the third and fifth aspects of the invention is shown in FIGS. 1, 2a and 2b. The apparatus 10 comprises an outer vessel 12 surrounding an inner heating or cooling vessel 14 separated by an airspace 16. The outer vessel 12 and inner heating or cooling vessel 14 are substantially cylindrical in cross-section and form nested containers with the airspace 16 separating them. The inner heating or cooling vessel comprises a vessel connection rim 22 which connects to the outer vessel 12 and seals the airspace 16. The outer vessel 12 is constructed from an inflexible plastics material such as polypropylene, polystyrene or the like. The inner heating or cooling vessel 14 comprises an inner vessel wall 18 in the form of a flexible membrane which is constructed from a resilient material such as a styrene-butadiene copolymer. The inner vessel wall 18 comprises four heating or cooling devices in the form of four heating or cooling bands 20a-20d which are embedded within the vessel wall 18 and extend there-around in an undulating or serpentine manner. Each heating or cooling band is spaced apart from adjacent heating or cooling bands 20a-20d. The heating bands 20a-20d comprise resistive heating elements which apply heat energy to the vessel wall 18 when activated.

The resilient inner vessel wall 18 is flexible and moveable by way of negative or positive pressure applied through airspace 16, which is connected to an air and vacuum pump (not shown).

Use of the application 10 will now be described with reference to FIGS. 1, 2a and 2b. A sample container in the form of a vial 2, as shown in FIG. 1, is inserted into the inner heating vessel 14. The vial 2 comprises a vial wall 4 which holds a frozen sample material 8, consisting of frozen cellular or biological tissue matter and frozen cryopreservant comprising glycerol containing 0.15% wt NaCl. The sample material 8 partially fills the vial 2 and the vial wall 4 is sealed with a cap 6.

In order to place the vial 2 in the inner heating vessel 14 the inner vessel wall 18 is biased from a first resting position in which the vessel wall 18 has a diameter substantially smaller than that of the vial 2, to a second, open position to which the vessel wall 18 has a diameter substantially larger than that of the vial 2, such that the vial 2 can be inserted within the vessel wall 18. Movement from the first position to the second position is achieved via applying a partial vacuum in the airspace 16, in order to bellow the inner wall 18 outwardly. When the vial 2 has been inserted within the vessel wall 18 the partial vacuum is released and the vessel wall 18 moves back to the first, resting position and conforms to, and abuts, the vial 2, as shown in FIGS. 2a and 2b. The membranous inner wall 18 adheres to and conforms with a large region of the vial wall 4. In the embodiment shown in FIGS. 2a and 2b, the sample 8 is of a size such that only the inner wall region which includes the heating bands 20c and 20d contacts the vial wall 4 which contacts the sample 8. The heating bands 20a and 20b of the inner wall 18 are therefore above the level of the sample 8 and abuts regions of the vial wall 4 above the level of the sample 8.

When the vial 2 is in the correct position within the inner wall 18, the sample 8 is thawed in the following manner, which is an embodiment of the methods of the first, second and fourth aspects of the invention.

Firstly, the temperature of the sample 8 is measured, as is the volume of the sample 8 and the volume of the vial 4, and each of the heating elements 20a-20d are activated according to an initial heating program. The initial heating program sets the heating elements 20a and 20b, which are above the level of the sample 8, to 37° C., whilst the heating elements 20c and 20d are initially set to 70° C. In this way, the heating bands 20c and 20d, which are present in the inner wall region 18 that contacts the vial wall 4 which is in turn in contact with the sample 8, ensure that a higher heat/energy transfer is effected through the region of the inner wall 18 of the inner heating vessel 14, through the wall 4 of the vial 2, into the sample 8, than the region above the level of the sample 8.

After the initial program is activated, the apparatus 10 is also agitated, in order to agitate the sample 8, and ensure movement of the sample within the vial 2 so that no portion of the sample 8 contacts the vial wall 4 for a prolonged length of time.

As initial heating progresses, and the sample 8 begins to thaw, the temperature and the ice fraction are measured in the sample 8 and the heating program adjusted accordingly.

Figure 4B:
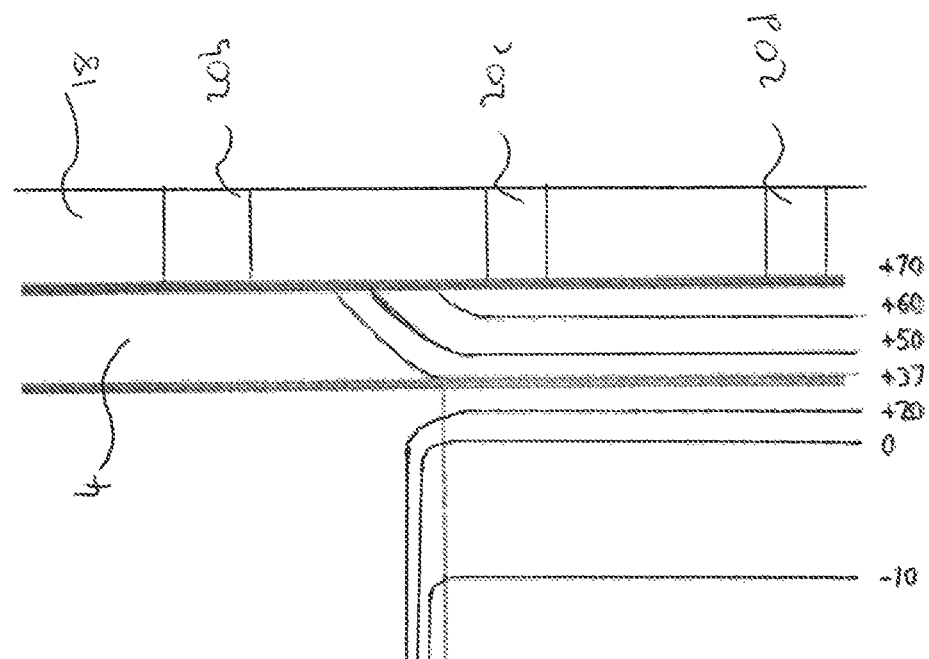
FIGS. 4a and 4b illustrate cross-sectional views taken from the boxed area of FIG. 2a, showing thermal gradients across the sample container wall during different heating/thawing regimes.

FIG. 4b shows the temperature isotherm of a zoomed in region bounded by the dotted box of FIG. 2a at the end of the initial heating program as can be seen in FIG. 4b, due to the differential power and heat transfer to the sample 8, through the vessel wall 18 and vial wall 4 in the areas of the vial wall 4 contacting the sample, compared to the heat and power heat transfer through the vessel wall 18 and vial wall 4 in the regions above the level of the sample 8, a temperature gradient is created by the heat and energy flow through the walls to maintain an inner vial wall temperature of 37° C. in both regions. This is the optimal condition possible for rapid thawing by conduction.

Figure 4A:
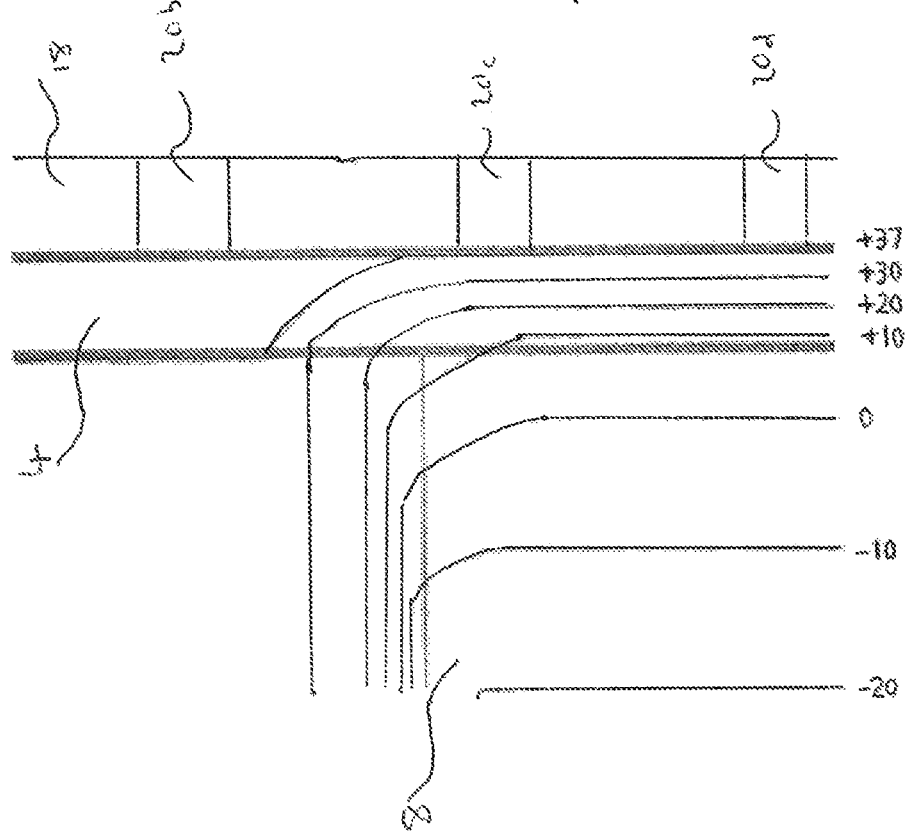
Figure 5:
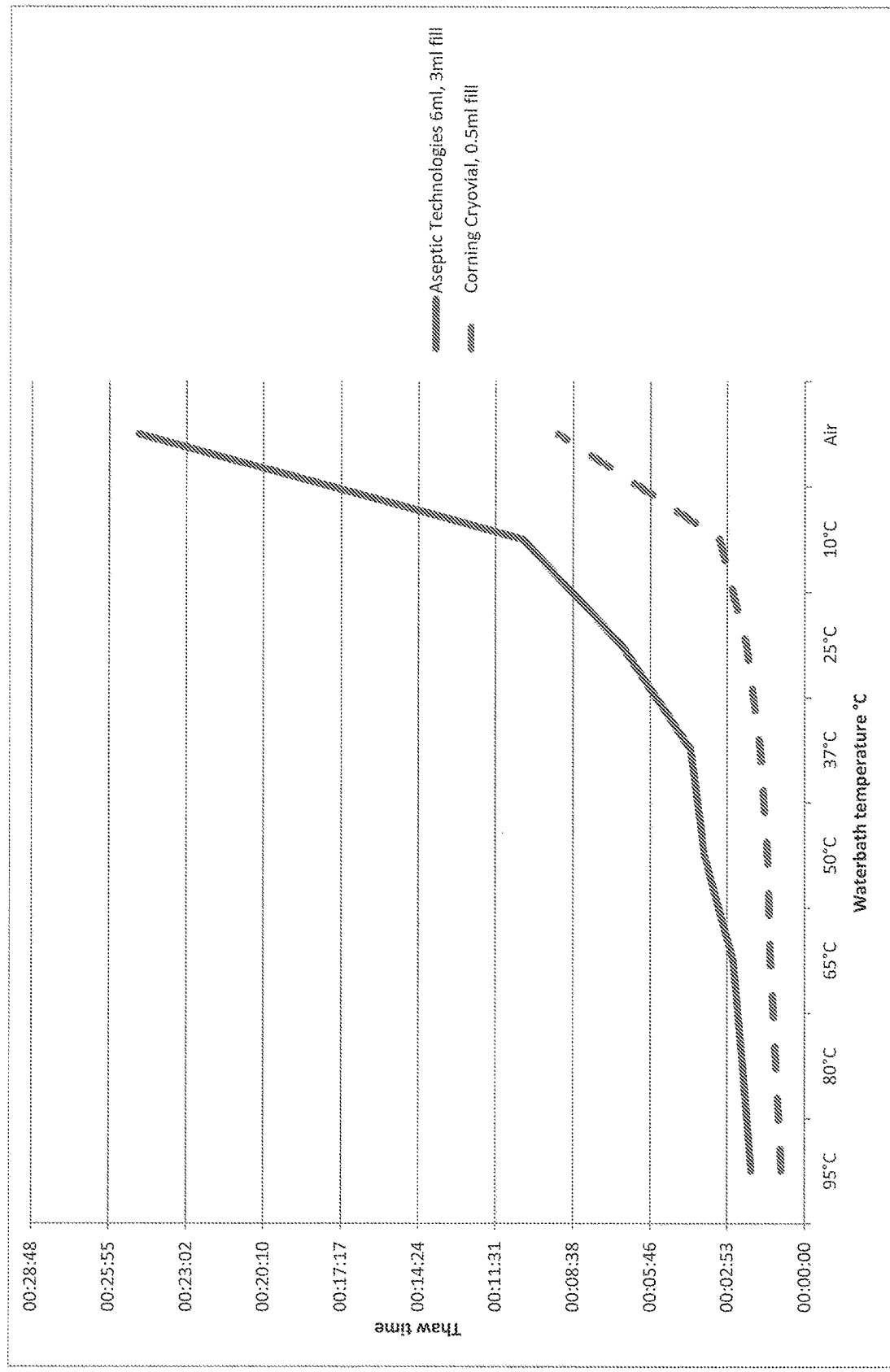
FIG. 5 is a graph illustrating thawing speed versus outside wall temperature in relation to thawing of a cryopreserved sample.
Figure 6:
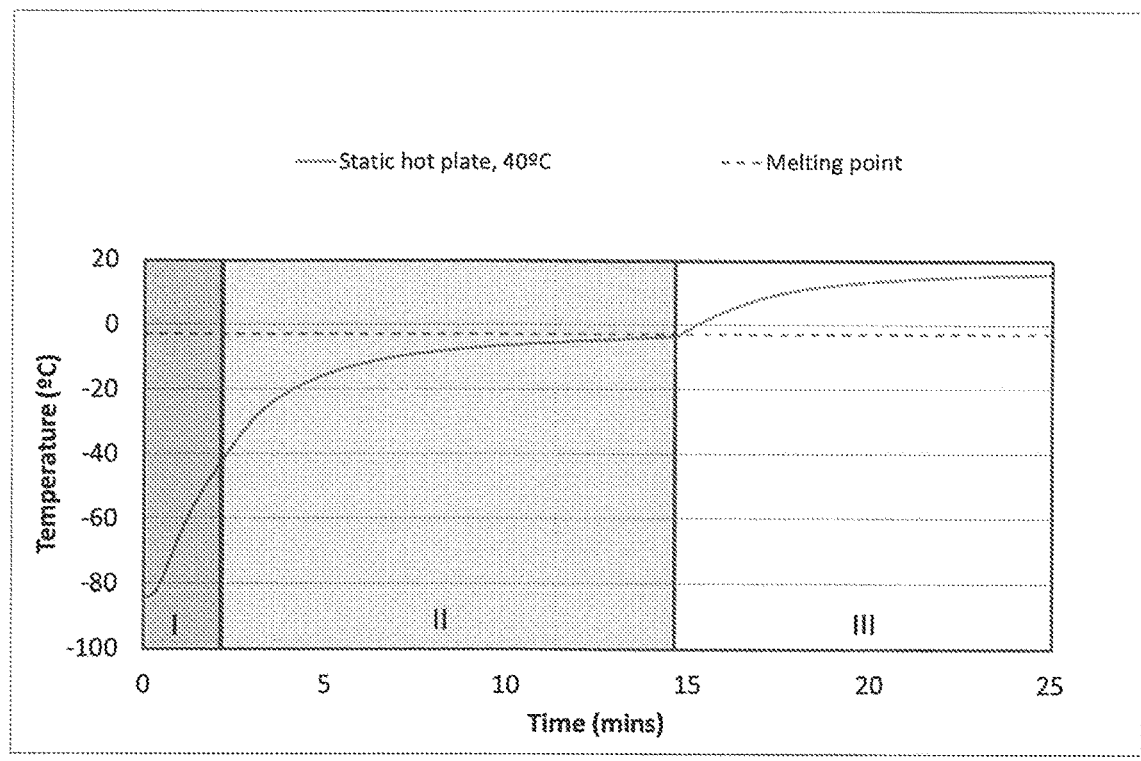
FIG. 6 is a graph illustrating three distinct thawing stages of a cryopreserved sample under a constant temperature.
Figure 7:
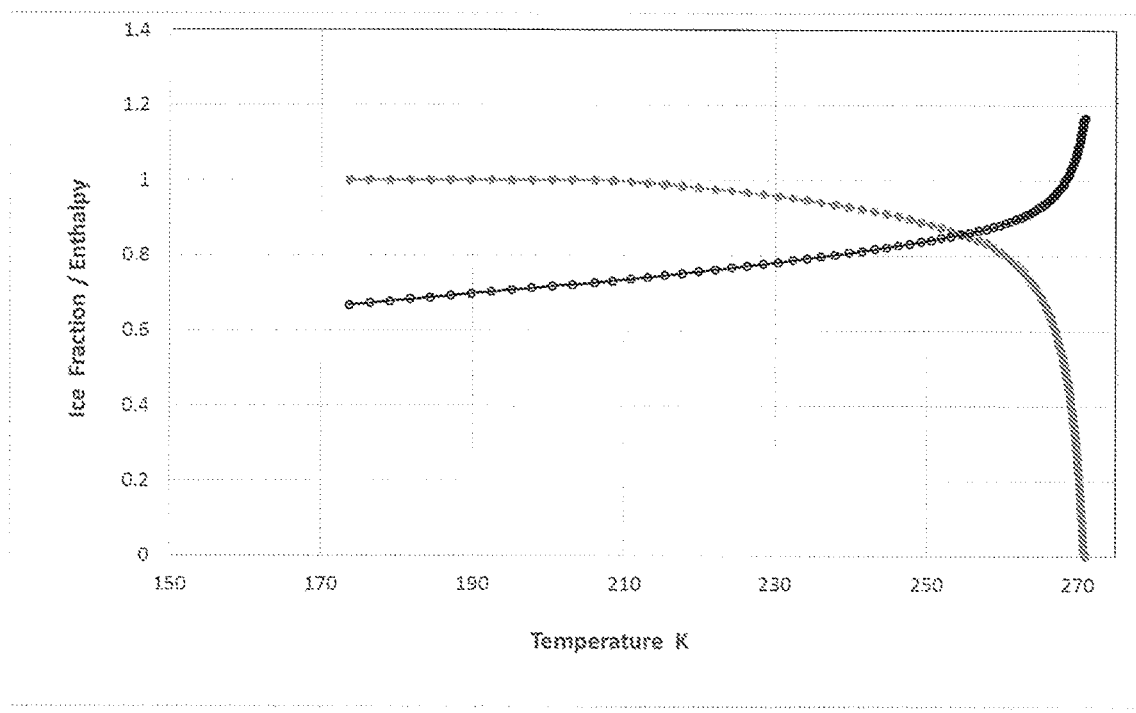
FIG. 7 illustrates the equilibrium ice fraction curve (light line) and enthalphy curve (dark line) for a solution of glycerol (10% w/w) in 0.15 m NaCl.
Figure 8:
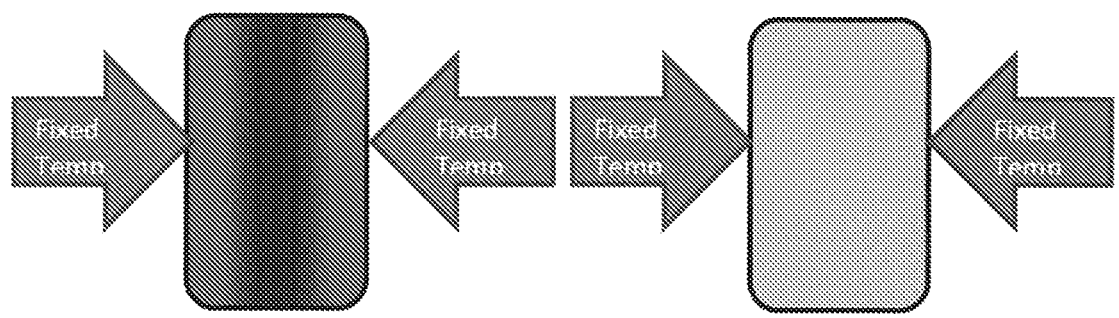
FIG. 8 illustrates the internal temperature distribution of a liquid under a) an internal temperature gradient (left-hand image) and b) a uniform temperature distribution within the liquid (right-hand image).

FIG. 4a shows the situation where each of the heating bands 20b, 20c and 20d apply a constant and uniform heat transfer across the vial wall 4 in both the region contacting the sample 8 and above the sample 8, in which the heating bands, 20b, 20c and 20d are set at 37° C. It can be seen that having each of the heating bands 20b-20d set to 37° C., this results in a lower than optimal inner wall 18 and vial wall 4 temperature at the same time stage as shown in FIG. 4b for thawing the sample 8 quickly, as the temperature gradients across sections of the vial 2 in contact with the sample 8 lead to a much lower internal vial wall temperature (10° C. in the set-up shown in FIG. 2a).

In addition, if the inner wall 18 is heated to a single fixed temperature, the vial wall 4 will reach the inner wall 18 temperature above the sample 8 (which acts as a heat sink). If the sample is agitated (which is generally required in all cryothawing processes), the sample 8 would then be in contact with areas of the vial wall 4 that are at the external temperature. If this external temperature was above 37° C., this would damage any cellular material.

As thawing progresses, it is imperative to decrease the overall temperature of the internal wall 18 to a maximum of 37° C., so as not to damage the sample 8. The heating program, under closed loop control, may achieve this by employing one of the following methods:
  a) inferring or knowing the height of the ice within the container before thawing;
  b) monitoring the applied power of the heating bands 20a-20d as a function of the temperature of the vial wall 4 during the thawing process; and
  c) determining that the ice-fraction within the sample 8 has fully thawed (phase change enthalpy is overcome), which normally occurs when the bulk temperature of the sample 8 rises rapidly.

In some embodiments, the sample 8 will thaw such that there are separated regions of frozen material within liquid aqueous components (or thawed solid components) at various points in time during the thawing process. In such cases, it would also be advantageous to enable targeted heating of areas of the vial wall 4 which abut and contact the frozen material using more heat/energy than applied to areas of the vial wall 4 not contacting the frozen material. In such instances, the heating program can monitor the presence of regions of frozen material, such as by measuring the ice fraction, and selectively activate any or all of heating bands 20a-20d to increase or decrease heat energy applied across the inner wall 18 and vial wall 4 at regions where the vial wall 4 contacts the frozen material of the sample 8.

Although the embodiments shown in FIGS. 1, 2a and 2b utilises resistive heating bands 20a-20d as the heating element to physically contact and transfer heat to the vial wall 4, other heating elements may be used, for example radiative heating (e.g. infra-red heating) of the vial 4 via infra-red heating elements replacing heating bands 20a-20d, or heating the vial 4 using heated fluid conduits replacing the heating bands 20a-20d. In such embodiments, spatial control of heating (e.g. heating of specific regions of the sample 8 may be achieved by the use of shuttering, windowing or focusing/imaging of the radiative heat source and/or spectral control of the radiative heat source, or through shuttering of different fluid temperature zones or flows around the inner wall 18 in the case of heated fluid embodiments.

Although not shown in FIGS. 1, 2a and 2b, the apparatus 10 also includes a number of components to monitor the temperature of the sample 8, vial wall 4 and inner wall 18. These components may be heat or temperature sensors embedded within the inner wall 18 or infra-red sensors embedded within the inner wall 18 and arranged to detect infra-red emissions from the surface of the vial 4, or from the sample 8 itself. Spatial resolution of any of the aforesaid measurements is achieved by using multiple sensors physically separated within the inner wall 18 and these may also be combined as a single component with the heating bands 20a-20d or equivalent heating elements.

When the region of the inner wall 18 and the region of the vial wall 4 adjacent to the sample 8 reach the same temperature as the region of the inner wall 18 and vial wall 4 above the level of the sample 8, i.e. 37° C., the heating bands 20a-20d may be set to maintain the temperature. Alternatively, the heating bands 20a-20d may be set to 37° C. once the sample 8 has fully thawed.

Once the sample 8 has fully thawed, the vial 2 may be removed from the apparatus 10 as required.

Figure 3:
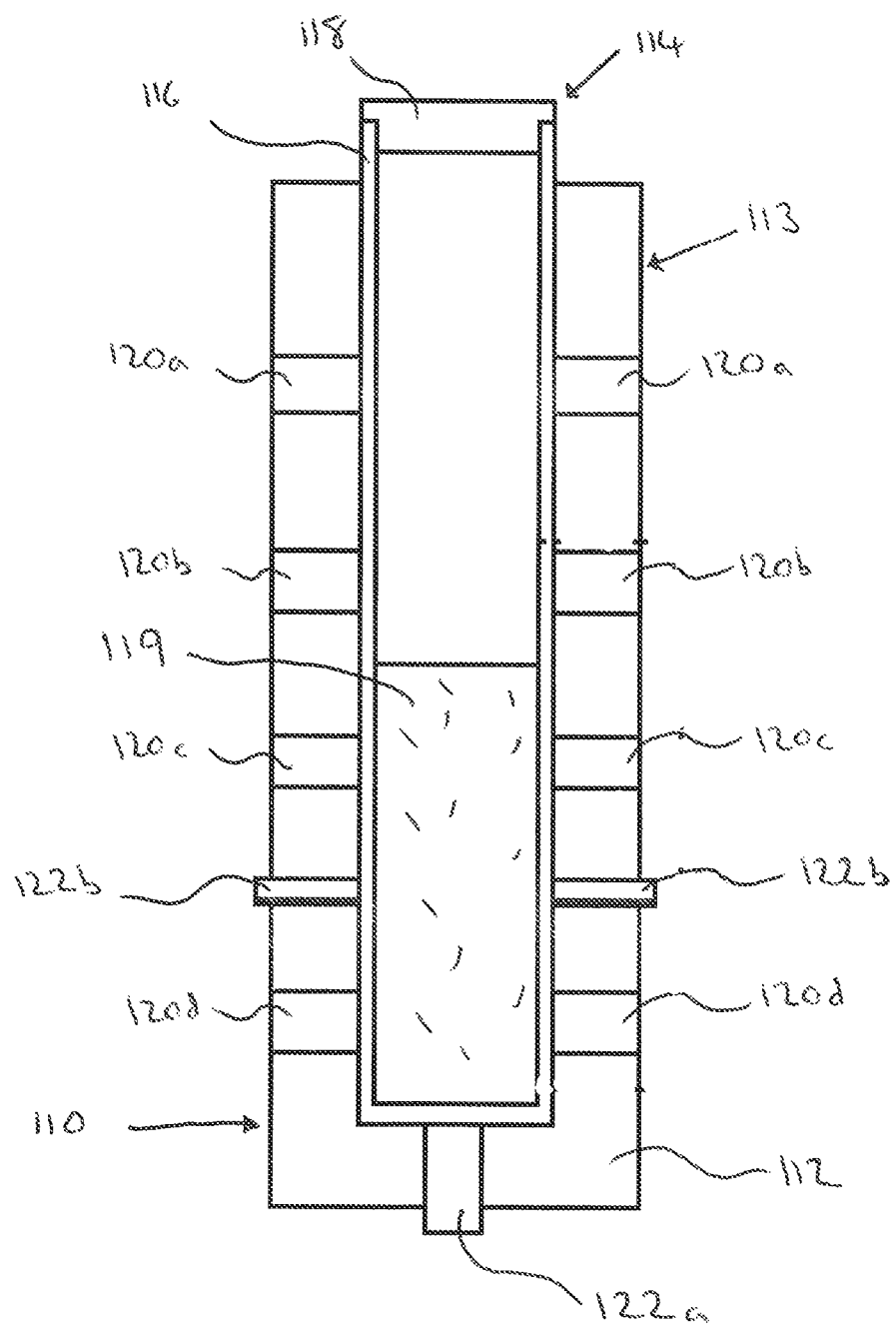
FIG. 3 illustrates a second embodiment of a sample thawing apparatus of the invention with an inserted frozen biological sample container.

FIG. 3 illustrates a second embodiment of a thawing apparatus of the invention, for use in any one of the methods of the first, or third aspects of the invention. The apparatus is similar to that of the embodiments as shown in FIGS. 1, 2a and 2b, but includes agitation means 122a, 122b. The embodiments shown in FIG. 3 comprises an apparatus 110 including an inner vessel 113 of generally circular cross-section arranged to hold a sample container in the form of a vial 114. The inner vessel 113 includes four spatially separated heating elements in the form of heating bands 120a, 120b, 120c and 120d, which extend around the wall 112 of the inner vessel 113, in a similar manner to the embodiments shown in FIGS. 1, 2a and 2b. The heating bands 120a-120d are as described for the embodiment shown in FIGS. 1, 2a and 2b. The vial 114 includes a vial wall 116 and a sealing cap 118. The vial contains a sample of frozen material 119 and in the embodiments as shown in FIG. 3, the heating bands 120a and 120b are located above the level of the sample 119, while the heating bands 120c and 120d are located in the inner wall 112 contacting the vial wall 116 adjacent to the sample 119. As stated previously, the inner vessel 113 includes two agitation means in the form of agitators 122a and 122b, located within the vessel 112. The agitator 122a is located in the bottom of the inner vessel 113, while the agitator 122b is located around the sides of the inner wall 112.

Use of the apparatus 110 will now be described with reference to FIG. 3.

To optimise thermal power transfer into the sample 119, the sample 119 is thawed in a manner by which the applied wall temperature of the inner wall 112 and vial wall 116 and applied agitation are varied as a function of the ice-fraction (ratio of frozen material to non-frozen material of the sample 119). The ice-fraction can be obtained as a function of direct temperature measurement, by calorimetry based deduction, by light transmission, or by measurement of changing conditions of agitation, for example.

At the beginning of thawing, the vial 114 is inserted into the inner vessel 113 and overall agitation of the sample 119 is activated by activating the agitators 122a and 122b. The frequency and amplitude of agitation may be controlled as a function of any of the above parameters such as ice-fraction, temperature of the sample 119, volume of the vessel 113, volume of the sample 119 etc. In addition spatially differentiated agitation of different regions of the sample 119 may be effected by activating either of the agitators 122a or 122b separately. For example if the lower region of the sample 119 needs to be agitated, whilst the upper region does not, the agitator 122b can be shut off, while the agitator 122a at the bottom of the vessel 113 continues to agitate the lower region. Likewise, the agitators 122a and 122b can be differentially controlled to agitate at different frequencies and/or oscillations at the same or different times, to fine tune the agitation of different regions of the sample 119.

In the embodiments shown in FIG. 3, the following parameters of the sample 119 and vessel 113 are determined prior to initial agitation: the type and thermal conductivity of the vial 114, the volume of the sample 119, the initial temperature of the sample 119 and the composition of the sample 119. Once these parameters have been determined, an initial agitation program is calculated as a function of the volume of the vial 114, volume of the sample, the ice fraction in the sample 119 (which initially will be 100% frozen material) and the thermal conductivity of the vial 114. The sample volume and sample ice fraction is monitored throughout thawing and the agitation program changed to apply variable agitation (spatially variable agitation or varying frequency and oscillation) to the sample 119 or regions thereof over time, in response to any changes of sample volume and sample ice fraction.

In addition, thawing of the sample 119 is achieved by heat/energy across the inner wall 112 and vial wall 116 using the heating bands 120a-120d. Initial heating is effected by heating the sample 119 to a temperature above its glass transition temperature (Tg) but below the melting temperature of any aqueous components of the sample for a period of approximately two minutes. In this embodiment the frozen sample 119 comprising biological material and a glycerol/NaCl cryoprotectant, is warmed from its cryogenic storage temperature which may be below –100° C. (–196° C. when stored in liquid nitrogen), to a temperature of around –30° C., at which point approximately 20% of the ice-fraction has melted. This is achieved by rapidly heating the sample 119 at a temperature of approximately 40° C. utilising all the heating bands 120a-120d set at 40° C. At the end of this heating period, the heating of the frozen sample 119 is slowed, and heating is maintained over a second time period of approximately fifteen minutes until the sample 119 reaches a temperature of approximately –2° C. to –3° C., in which the majority of the aqueous components have changed phase from solid to liquid. Once the sample 119 is fully melted it is important not to overheat, so the heating bands 120a-120d may be switched off, agitation is stopped and the vial 114 can be removed from the apparatus 110 if desired. However, in this embodiment heating is then maintained for a third time period until the sample 119 reaches a temperature of around 4° C., at which point both the frozen biological material and the aqueous components have fully thawed. This third time period is approximately five to ten minutes. During each of the three thawing phases and time periods, agitation of the sample 119 is maintained according to the agitation program described hereinbefore.

In the embodiments described for FIGS. 1-4, the sample 119 is frozen cellular material in cryoprotectant comprising glycerol containing 0.15% wt sodium chloride. Other cryoprotectants may be used such as dimethyl sulphoxide (DMSO) or propylene glycol for example. In the embodiment utilising glycerol/NaCl, approximately 80% of the ice-fraction melts in the temperature zone –12.5° C. to –2.5° C., whilst the remaining 20% of the ice melts in the temperature zone –64° C. (the Tg of this cryoprotectant solution) to –12.5° C. The most damaging temperature zone during thawing is associated with the thawing of the final 80% of the ice-fraction, which occurs between –12.5° C. and –2.5° C. The melting of the first 20% of the ice-fraction can therefore be carried out to a relatively slow rate of heating without any detrimental effects on cell viability.

The apparatus 110 could be adapted to include the facility to actively control the post-thaw sample temperature, by utilising a Peltier element in place of the heating bands 120a-120d, to both heat the sample during thawing, and to cool the sample post-thaw, to maintain its temperature at around 4° C. until it is desired to remove the sample 119.

The above embodiments are described by way of example only. Many variations are possible without departing from the scope of the invention, as defined in the appended claims.

The invention claimed is:

1. A method of thawing a sample wherein said sample is within a container comprising an outer wall and an inner wall, said method comprising
   a) heating at least one region of the outer wall of said container to a temperature equal to or above that at which cellular damage occurs and wherein the inner wall of the container is at a temperature lower than that at which cellular damage occurs, or
   b) heating the container such that an outer wall region of said container corresponding to an inner wall region which contacts the sample, is heated to a temperature higher than another outer wall region corresponding to another inner wall region which does not contact the sample; and
   c) i) calculating an agitation program as a function of 1) either or both of a sample volume and a type of container, 2) a sample ice fraction in the sample, and 3) the thermal conductivity of the sample container;
      ii) agitating said sample according to the agitation program to agitate at least one region of the sample;
      iii) changing the agitation program applied to the at least one region of the sample in response to changes in the sample volume and the sample ice fraction; and
      iv) further agitating said sample according to the changed agitation program to agitate the at least one region of the sample.

2. The method according to claim 1, wherein in step b) the outer wall region of the container corresponding to the inner wall region which contacts the sample is heated to a temperature at which cellular damage would occur, and wherein the outer wall region of the container corresponding to the inner wall region which does not contact the sample is at a temperature less than that at which cellular damage would occur.

3. The method according to claim 1, wherein step b) further comprises a step of monitoring the temperature of the inner wall region contacting the sample and the inner wall region not contacting the sample and adjusting the heat or energy applied to one or both of the corresponding outer wall regions of the sample container in response to changes in the temperature of the two regions and/or a step of monitoring the sample temperature and/or the ice fraction in the sample and adjusting the heat or energy applied to the outer wall region, the corresponding inner wall region to which contacts the sample material.

4. The method according to claim 1, wherein in b) the inner wall of the container is at a temperature less than that at which cellular damage would occur.

5. The method according to claim 1, wherein in step a) or b) said temperature at which cellular damage would occur is a temperature above 37° C. and/or said temperature less than that at which cellular damage would occur is a temperature at or less than 37° C.

6. The method as claimed in claim 1, wherein in step a) or b) said sample is agitated.

7. The method according to claim 1, wherein in step c) steps ii) and iii) are repeated at least once, or wherein steps ii) and iii) are carried out continuously.

8. The method according to claim 1, wherein in step c) said method comprises a step of monitoring sample volume and/or sample ice fraction carried out within or sequentially to step ii) and/or a step of determining the container type and/or the volume of the sample material and optionally comprises determining the thermal conductivity of the sample container, before step i).

9. The method according to claim 1, wherein in step c) (1) agitation of the sample comprises agitation of a single region of the sample, of multiple regions of the sample, or the whole sample, (2) the change in agitation applied to the at least one region of the sample in step iii) comprises changing the frequency, amplitude or both frequency and amplitude of the agitation, (3) the sample is heated and/or (4) a heating and agitation program as a function of the volume of the sample, and the ice fraction is calculated, wherein the sample is heated according to the heating program to heat at least one region of the sample and wherein the heating program is changed to at least one region of the sample in response to changes in the sample volume and/or ice fraction in the sample.

10. The method of claim 1, wherein in step c) the method reduces shearing during the agitation of the sample comprised in the container.

11. The method as claimed in claim 1, wherein said sample is a biological sample comprising a biopharmaceutical, a cellular material, a biological tissue, a biological organ or a part thereof, nucleic acids, proteins, polypeptides and/or amino acids.

* * * * *